US011574611B2

(12) United States Patent
Kim et al.

(10) Patent No.: US 11,574,611 B2
(45) Date of Patent: Feb. 7, 2023

(54) ELECTRONIC DEVICE AND METHOD FOR CONTROLLING THE SAME

(71) Applicant: Samsung Electronics Co., Ltd., Suwon-si (KR)

(72) Inventors: Kyung-Seok Kim, Suwon-si (KR); Jeong-Ho Cho, Suwon-si (KR); So-Young Lee, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/937,986

(22) Filed: Jul. 24, 2020

(65) Prior Publication Data
US 2020/0365115 A1 Nov. 19, 2020

Related U.S. Application Data

(63) Continuation of application No. 15/414,000, filed on Jan. 24, 2017, now abandoned.

(30) Foreign Application Priority Data

Jan. 29, 2016 (KR) .................. 10-2016-0011983

(51) Int. Cl.
G09G 5/10 (2006.01)
G09G 3/20 (2006.01)
G06F 1/16 (2006.01)

(52) U.S. Cl.
CPC ............. G09G 5/10 (2013.01); G06F 1/1626 (2013.01); G06F 1/1637 (2013.01);
(Continued)

(58) Field of Classification Search
CPC .. G09G 5/10; G09G 3/017; G09G 2320/0626; G09G 2354/00; G09G 2360/144; G09G 2360/16
See application file for complete search history.

(56) References Cited

U.S. PATENT DOCUMENTS

2004/0075045 A1   4/2004   Hermsen
2005/0134751 A1   6/2005   Abileah et al.
(Continued)

FOREIGN PATENT DOCUMENTS

CN   102915721 A   2/2013
CN   104937657 A   9/2015
(Continued)

OTHER PUBLICATIONS

Chinese Office Action dated Nov. 4, 2020, issued in Chinese Application No. 201780008726.1.
(Continued)

Primary Examiner — Sahlu Okebato
(74) Attorney, Agent, or Firm — Jefferson IP Law, LLP

(57) ABSTRACT

An electronic device is provided. The electronic device includes a housing including a first surface and a second surface facing in an opposite direction of the first surface, a display exposed through the first surface of the housing and including a plurality of pixels, at least one illumination sensor disposed between the display and the second surface of the housing or disposed in the display, at least one processor electrically connected with the display and the at least one illumination sensor, and a memory electrically connected with the at least one processor, wherein the memory may store instructions configured to, upon execution by the at least one processor, cause the at least one processor to control to transmit to the display image data to be output through the plurality of pixels of the display, receive illumination-related data obtained by detecting light outside the first surface of the housing using the at least one illumination sensor, and change a brightness of at least a portion of the display based on at least a portion of the transmitted image data and the illumination-related data.

17 Claims, 16 Drawing Sheets

(52) U.S. Cl.
CPC ............. *G06F 1/1684* (2013.01); *G09G 3/20* (2013.01); *G09G 2320/029* (2013.01); *G09G 2320/0626* (2013.01); *G09G 2354/00* (2013.01); *G09G 2360/144* (2013.01); *G09G 2360/145* (2013.01); *G09G 2360/16* (2013.01)

(56) References Cited

U.S. PATENT DOCUMENTS

| | | |
|---|---|---|
| 2006/0132424 A1 | 6/2006 | Foo et al. |
| 2008/0007515 A1 | 1/2008 | Wu et al. |
| 2009/0040207 A1* | 2/2009 | Park ............ G09G 3/3233 345/211 |
| 2009/0109234 A1* | 4/2009 | Lee ............ G09G 5/02 345/589 |
| 2010/0053051 A1 | 3/2010 | Nitanda |
| 2010/0253614 A1 | 10/2010 | Chen |
| 2010/0253660 A1 | 10/2010 | Hashimoto |
| 2011/0134252 A1 | 6/2011 | Furukawa |
| 2011/0227966 A1 | 9/2011 | Mori |
| 2012/0212467 A1* | 8/2012 | Kohtoku ............ G02F 1/1354 345/207 |
| 2012/0280921 A1 | 11/2012 | Kwon |
| 2013/0033455 A1 | 2/2013 | Jeong et al. |
| 2013/0033517 A1 | 2/2013 | Choi et al. |
| 2013/0127923 A1 | 5/2013 | An et al. |
| 2013/0321486 A1 | 12/2013 | Cha |
| 2013/0328842 A1 | 12/2013 | Barnhoefer et al. |
| 2013/0342585 A1* | 12/2013 | Chun ............ G09G 3/3208 345/690 |
| 2014/0152632 A1 | 6/2014 | Shedletsky et al. |
| 2014/0166850 A1* | 6/2014 | Zheng ............ H04N 5/58 250/205 |
| 2015/0042688 A1 | 2/2015 | Kim |
| 2015/0221259 A1 | 8/2015 | Soto |
| 2015/0356914 A1 | 12/2015 | Aoyama |
| 2016/0189619 A1 | 6/2016 | Park et al. |
| 2016/0358526 A1 | 12/2016 | Wang et al. |
| 2017/0092228 A1* | 3/2017 | Cote ............ G09G 3/3225 |

FOREIGN PATENT DOCUMENTS

| | | |
|---|---|---|
| JP | 2003-021821 A | 1/2003 |
| KR | 2003-0075189 A | 9/2003 |
| KR | 10-2008-0065031 A | 7/2008 |
| KR | 10-2010-0109838 A | 10/2010 |
| KR | 10-2012-0113050 A | 10/2012 |
| KR | 10-2013-0055256 A | 5/2013 |
| KR | 10-2013-0081975 A | 7/2013 |
| KR | 10-2015-0013610 A | 2/2015 |
| KR | 10-2015-0018999 A | 2/2015 |
| KR | 10-2015-0029433 A | 3/2015 |

OTHER PUBLICATIONS

European Search Report dated Sep. 12, 2018, issued in a counterpart European application No. 17744532.7-1209/3341930.

Korean Office Action dated Feb. 24, 2022, issued in Korean Patent Application No. 10-2016-0011983.

* cited by examiner

ELECTRONIC DEVICE AND METHOD FOR CONTROLLING THE SAME

CROSS-REFERENCE TO RELATED APPLICATION(S)

This application is a continuation application of prior application Ser. No. 15/414,000, filed on Jan. 24, 2017, which claims priority under 35 U.S.C § 119(a) of a Korean patent application number 10-2016-0011983, filed on Jan. 29, 2016, in the Korean Intellectual Property Office, the disclosure of which is incorporated by reference herein in its entirety.

TECHNICAL FIELD

The present disclosure relates to electronic devices. More particularly, the present disclosure relates to electronic devices controlling displays using, e.g., ambient light intensity, and methods for controlling the same.

BACKGROUND

There are proposed methods for controlling the display of an electronic device on a wearable device, smartphone, video player, or other portable devices (hereinafter, collectively referred to as an electronic device). A proposed technique is to recognize the ambient light intensity for enhancing visibility and reducing current consumption by an electronic device having a display and controlling the brightness of images output through the display according to the recognized light intensity.

For example, an illumination sensor capable of recognizing light intensity may be exposed outside the electronic device or embedded in an upper portion of the display of the electronic device. In such case, in order to allow for use of the illumination sensor, the illumination sensor may be embedded to sense ambient light intensity, with a printed portion of the window opened at an upper portion of the active area of the display. The electronic device may create a database for brightness control according to light intensities detected by such method and automatically control the brightness of the display.

Electronic devices use a separate hole for the illumination sensor or red-green-blue (RGB) sensor at an upper, unprinted open portion of the display to embed the illumination sensor, and thus, their design may be limited upon manufacturing the electronic devices according to the related art.

Further, such electronic devices employ separate manufacturing processes or additional manufacturing processes for printing depending on whether a hole is needed upon manufacturing the electronic devices according to the related art.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide electronic devices controlling displays using, e.g., ambient light intensity, and methods for controlling the same.

According to an embodiment of the present disclosure, an electronic device that allows an illumination sensor to be embedded even without a separate hole at an upper portion of the display is provided.

According to an embodiment of the present disclosure, a method for controlling an electronic device that may embed an illumination sensor in an electronic device free from an external light source, distinguish light from the external light source and light by image data transmitted to the internal display, and exactly measure an actual illumination value necessary for controlling the brightness of the display is provided.

In accordance with an aspect of the present disclosure, an electronic device is provided. The electronic device includes a housing including a first surface and a second surface facing in an opposite direction of the first surface, a display exposed through the first surface of the housing and including a plurality of pixels, at least one illumination sensor disposed between the display and the second surface of the housing or disposed in the display, at least one processor electrically connected with the display and the at least one illumination sensor, and a memory electrically connected with the at least one processor, wherein the memory may store instructions configured to, upon execution by the at least one processor, cause the at least one processor to control to transmit to the display image data to be output through the plurality of pixels of the display, receive illumination-related data obtained by detecting light outside the first surface of the housing using the at least one illumination sensor, and change a brightness of at least a portion of the display based on at least a portion of the transmitted image data and the illumination-related data.

In accordance with another aspect of the present disclosure, an electronic device is provided. The electronic device includes a housing including a first surface and a second surface facing in an opposite direction of the first surface, a display exposed through the first surface of the housing and including a plurality of pixels, at least one illumination sensor disposed between the display and the second surface of the housing or disposed in the display, at least one processor electrically connected with the display and the at least one illumination sensor, and a memory electrically connected with the at least one processor, wherein the memory may store instructions configured to, upon execution by the at least one processor, cause the at least one processor to control to transmit to the display image data to be output through the plurality of pixels of the display, monitor the amount of a current consumed upon transmission of the image data, receive illumination-related data obtained by detecting light outside the first surface of the housing using the at least one illumination sensor, and change a brightness of at least a portion of the display based on at least a portion of the monitored amount of current and the illumination-related data.

In accordance with another aspect of the present disclosure, a method for controlling an electronic device comprising a housing including a first surface and a second surface facing in an opposite direction of the first surface, a display exposed through the first surface of the housing and including a plurality of pixels, at least one illumination sensor disposed between the display and the second surface of the housing or disposed in the display, at least one processor electrically connected with the display and the at least one illumination sensor, and a memory electrically connected with the at least one processor, is provided. The method includes transmitting to the display image data to be output through the plurality of pixels of the display, receiving illumination-related data obtained by detecting light outside the first surface of the housing using the at least one illumination sensor, and changing a brightness of at least a portion of the display based on at least a portion of the transmitted image data and the illumination-related data.

In accordance with another aspect of the present disclosure, the illumination sensor for detecting illumination may be embedded in the electronic device, thereby eliminating the need of a separate process for forming a separate hole in a portion of the display outside of the electronic device as in the related art. Further, the illumination sensor may exactly sense illumination while distinguishing light output to the display from the inside of the electronic device and external light, enabling an exact determination as to the ambient environment of the user of the electronic device. Therefore, more exact illumination sensing, and easier and more precise automated brightness control of the electronic device may be achieved when the user moves in a dark place or room or moves at night.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
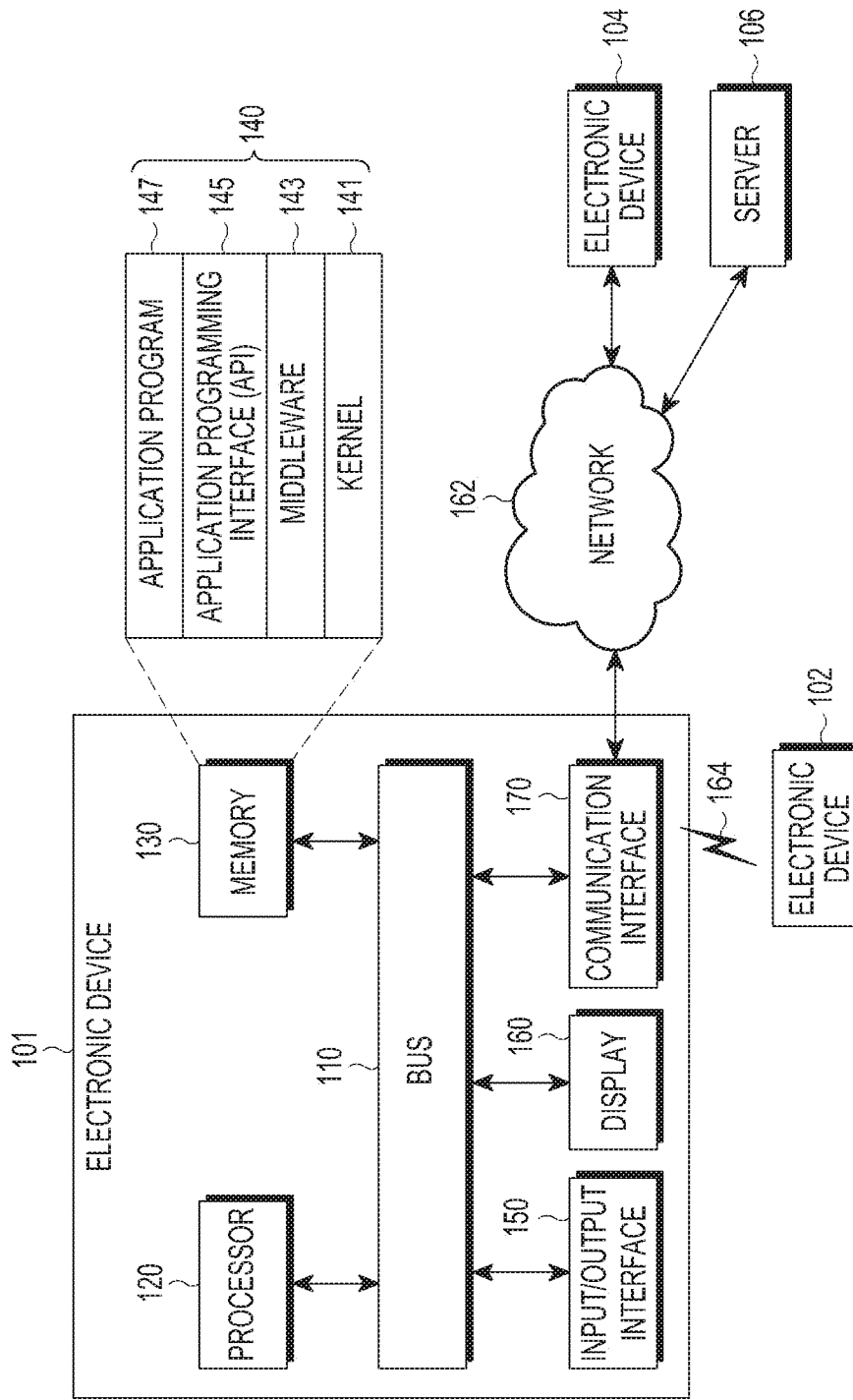
FIG. 1 is a view illustrating a use environment of a plurality of electronic devices according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a central processing unit (CPU) or application processor (AP) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), a Moving Picture Experts Group (MPEG-1 or MPEG-2) audio layer 3 (MP3) player, a mobile medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television (TV), a digital versatile disc (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs) of financial organizations, point of sales (POS) devices of stores, or Internet of things devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of part of furniture or building/structure, an electronic board, an electronic signature receiving device, a projector, or various measurement devices (e.g., devices for measuring water, electricity, gas, or electromagnetic waves). According to embodiments of the present disclosure, the electronic device may be flexible or may be a combination of the above-enumerated electronic devices. According to an embodiment of the present disclosure, the electronic device is not limited to the above-listed embodiments. As used herein, the term "user" may denote a human or another device (e.g., an artificial intelligent electronic device) using the electronic device.

FIG. 1 is a view illustrating a use environment of a plurality of electronic devices according to an embodiment of the present disclosure.

Referring to FIG. 1, according to an embodiment of the present disclosure, an electronic device 101 is included in a network environment 100. The electronic device 101 may include a bus 110, a processor 120, a memory 130, an input/output interface 150, a display 160, and a communication interface 170. In some embodiments, the electronic device 101 may exclude at least one of the components or may add another component. The bus 110 may include a circuit for connecting the components 110 to 170 with one another and transferring communications (e.g., control messages or data) between the components. The processing 120 may include one or more of a CPU, an AP, or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application program 147 to access the individual components of the electronic device 101 to control or manage the system resources.

The middleware 143 may function as a relay to allow the API 145 or the application program 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application program 147 to control functions provided from the kernel 141 or the middleware 143. For example, the API 133 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic LED (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user. For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device. In another example, the communication interface 170 may communicate with the external electronic device via a direct communication 164.

The wireless communication may include cellular communication using at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). According to an embodiment of the present disclosure, the wireless communication may include at least one of, e.g., wireless fidelity (Wi-Fi), Bluetooth (BT), BT low power (BLE), Zigbee, near field communication (NFC), magnetic secure transmission (MST), radio frequency (RF), or body area network (BAN). According to an embodiment of the present disclosure, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
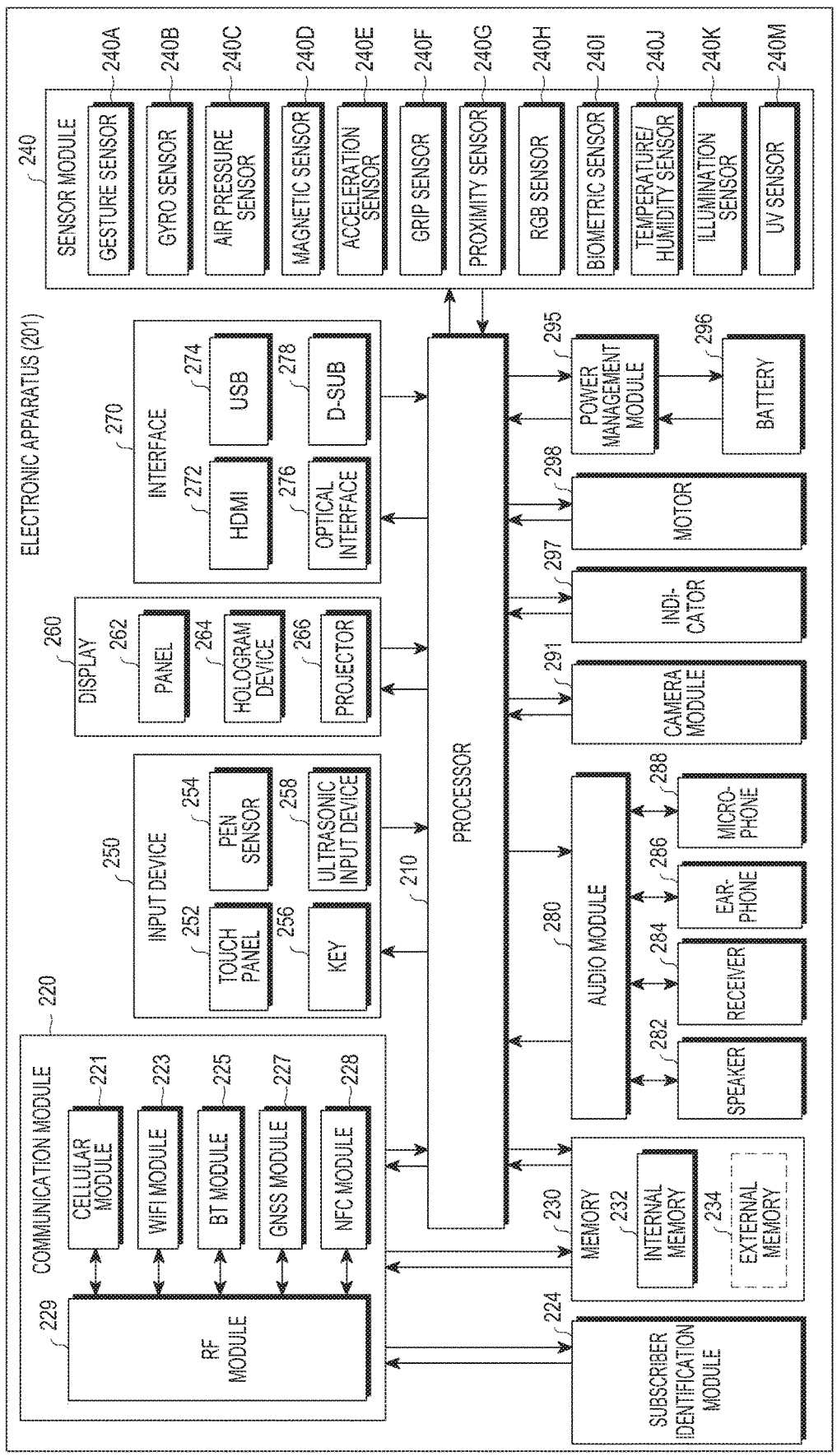
FIG. 2 is a block diagram illustrating an electronic device according to an embodiment of the present disclosure.

FIG. 2 is a block diagram illustrating an electronic device 201 according to an embodiment of the present disclosure.

Referring to FIG. 2, the electronic device 201 may include the whole or part of the configuration of, e.g., the electronic device 101 shown in FIG. 1. The electronic device 201 may include one or more processors (e.g., APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an OS or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor (ISP). The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface 170. The communication module 220 may include, e.g., a cellular module 221, a Wi-Fi module 223, a BT module 225, a GNSS module 227, a NFC module 228, and a RF module 229. The cellular module 221 may provide voice call, video call, text, or Internet services through, e.g., a communication network. The cellular module 221 may perform identification or authentication on the electronic device 201 in the communication network using a SIM 224 (e.g., the SIM card). According to an embodiment of the present disclosure, the cellular module 221 may perform at least some of the functions providable by the processor 210. According to an embodiment of the present disclosure, the cellular module 221 may include a CP. At least some (e.g., two or more) of the cellular module 221, the Wi-Fi module 223, the BT module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amplifier module (PAM), a frequency filter, a low noise amplifier (LNA), or an antenna. According to an embodiment of the present disclosure, at least one of the cellular module 221, the Wi-Fi module 223, the BT module 225, the GNSS module 227, or the NFC module 228 may communicate RF signals through a separate RF module. The SIM 224 may include, e.g., a card including a SIM or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic random access memory (DRAM), a static RAM (SRAM), a synchronous DRAM (SDRAM), etc.) or a non-volatile memory (e.g., a one-time programmable read-only memory (OTPROM), a PROM, an erasable and programmable ROM (EPROM), an electrically EPROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a memory stick™. The external memory 234 may be functionally or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., an red-green-blue (RGB) sensor, a bio sensor 240I, a temperature/humidity sensor 240J, an illumination sensor 240K, or an ultra violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 2701 may control the sensor module 240 while the processor 210 is in a sleep mode.

The input device 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present disclosure, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. The interface 270 may include e.g., a HDMI 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a SD card/MMC interface, or infrared data association (IrDA) standard interface.

The audio module 280 may convert, e.g., a sound signal into an electrical signal and vice versa. At least a part of the audio module 280 may be included in e.g., the input/output interface 150 as shown in FIG. 1. The audio module 280 may process sound information input or output through e.g., a speaker 282, a receiver 284, an earphone 286, or a microphone 288. For example, the camera module 291 may be a device for capturing still images and videos, and may include, according to an embodiment of the present disclosure, one or more image sensors (e.g., front and back sensors), a lens, an ISP, or a flash such as an LED or xenon lamp. The power management module 295 may manage power of the electronic device 201, for example. According to an embodiment of the present disclosure, the power management module 295 may include a power management integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may change with a type of the electronic device. According to various embodiments, the electronic device (e.g., the electronic device 201) may exclude some elements or include more elements, or some of the elements may be combined into a single entity that may perform the same function as by the elements before combined.

Figure 3:
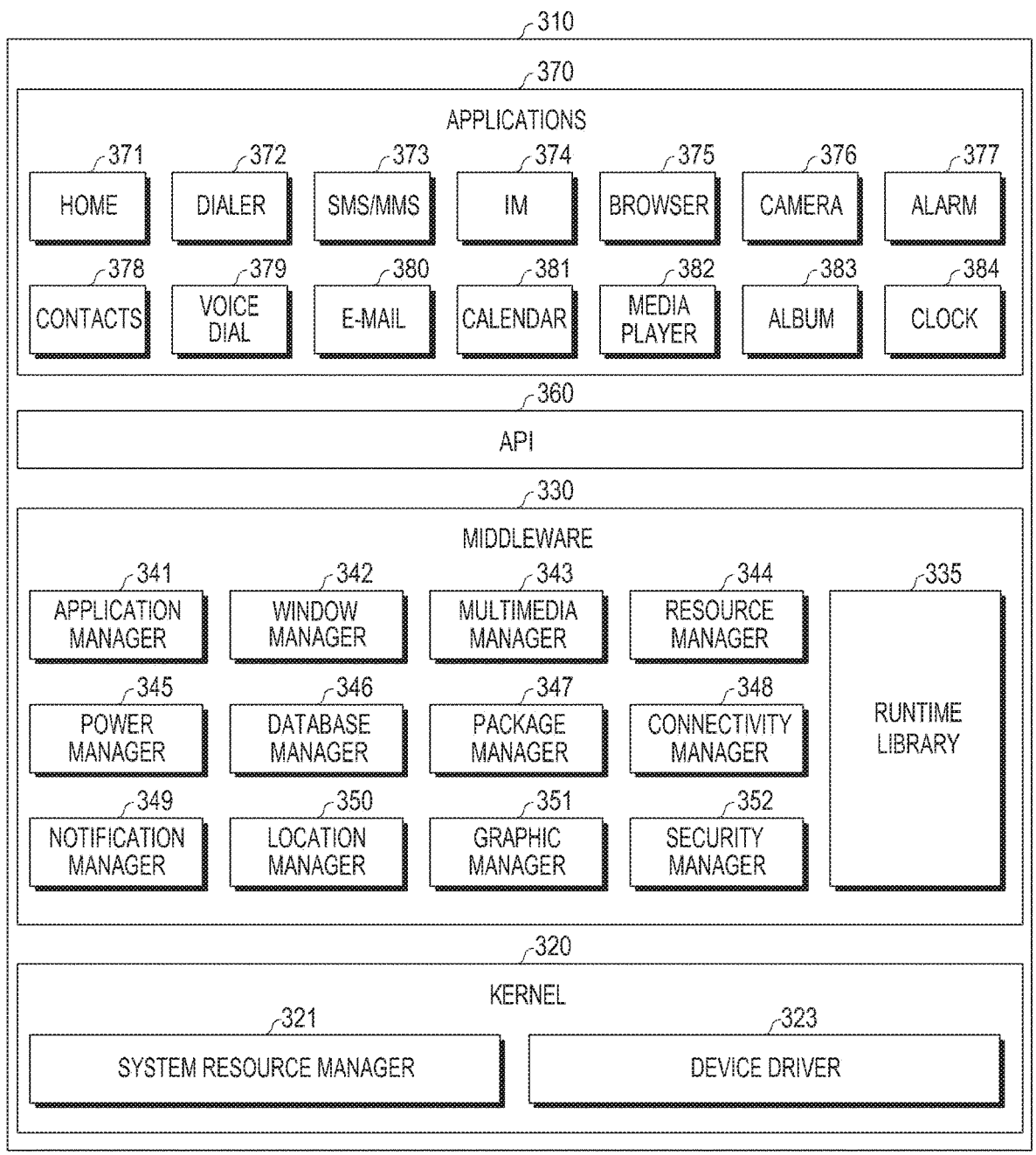
FIG. 3 is a block diagram illustrating a program module according to an embodiment of the present disclosure.

FIG. 3 is a block diagram illustrating a program module according to an embodiment of the present disclosure.

Referring to FIG. 3, according to an embodiment of the present disclosure, the program module 310 (e.g., the program 140) may include an OS controlling resources related to the electronic device (e.g., the electronic device 101) and/or various applications (e.g., the application program 147) driven on the OS. The OS may include, e.g., Android™, iOS™, Windows™, Symbian™, Tizen™, or Bada™. Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least a part of the program module 310 may be preloaded on the electronic device or may be downloaded from an external electronic device (e.g., the electronic devices 102 and 104 or server 106).

The kernel 320 may include, e.g., a system resource manager 321 or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a BT driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly used by applications 370. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341 may manage the life cycle of, e.g., the applications 370. The window manager 342 may manage graphical user interface (GUI) resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the battery capability or power and provide power information necessary for the operation of the electronic device. According to an embodiment of the present disclosure, the power manager 345 may interwork with a basic input/output system (BIOS). The database manager 346 may generate, search, or change a database to be used in the applications 370. The package manager 347 may manage installation or update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage, e.g., graphic effects to be offered to the user and their related user interface. The security manager 352 may provide system security or user authentication, for example. According to an embodiment of the present disclosure, the middleware 330 may include a telephony manager for managing the voice or video call function of the electronic device or a middleware module able to form a combination of the functions of the above-described elements. According to an embodiment of the present disclosure, the middleware 330 may provide a module specified according to the type of the OS. The middleware 330 may dynamically omit some existing components or add new components. The API 360 may be a set of, e.g., API programming functions and may have different configurations depending on OSs. For example, in the case of Android or iOS, one API set may be provided per platform, and in the case of Tizen, two or more API sets may be offered per platform.

The application 370 may include an application that may provide, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information). According to an embodiment of the present disclosure, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment of the present disclosure, the application 370 may include an application (e.g., a healthcare application of a mobile medical device) designated according to an attribute of the external electronic device. According to an embodiment of the present disclosure, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

As used herein, the term "module" includes a unit configured in hardware, software, or firmware and may be interchangeably used with other term, e.g., a logic, logic block, part, or circuit. The module may be a single integral part or a minimum unit or part of performing one or more functions. The module may be implemented mechanically or electronically and may include, e.g., an application-specific integrated circuit (ASIC) chip, field-programmable gate arrays (FPGAs), or programmable logic device, that has been known or to be developed in the future as performing some operations. According to an embodiment of the present disclosure, at least a part of the device (e.g., modules or their functions) or method (e.g., operations) may be implemented as instructions stored in a computer-readable storage medium (e.g., the memory 130), e.g., in the form of a program module. The instructions, when executed by a processor (e.g., the processor 120), may enable the processor to carry out a corresponding function. The computer-readable medium may include, e.g., a hard disk, a floppy disc, a magnetic medium (e.g., magnetic tape), an optical recording medium (e.g., compact disc ROM (CD-ROM), DVD, magnetic-optical medium (e.g., floptical disk), or an embedded memory. The instruction may include a code created by a compiler or a code executable by an interpreter. Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

Figure 4A:
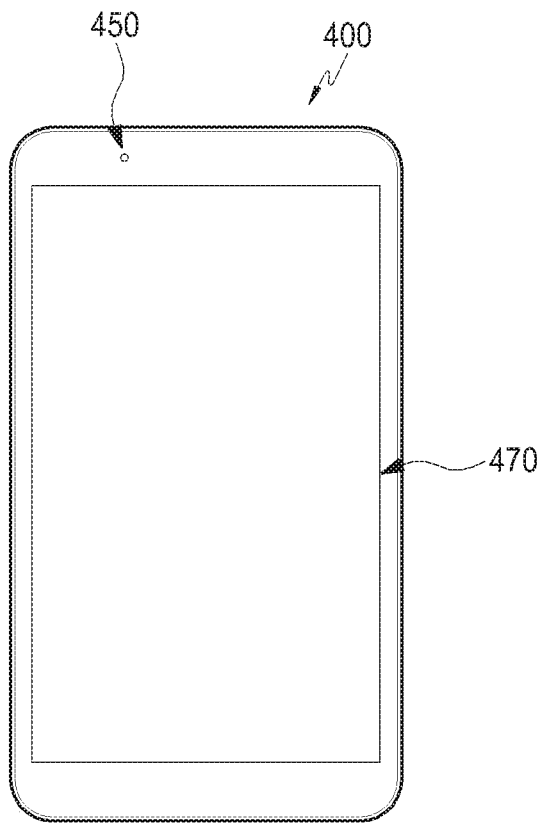
FIG. 4A is a front view illustrating an electronic device according to an embodiment of the present disclosure.

FIG. 4A is a front view illustrating an electronic device according to an embodiment of the present disclosure.

Figure 4B:
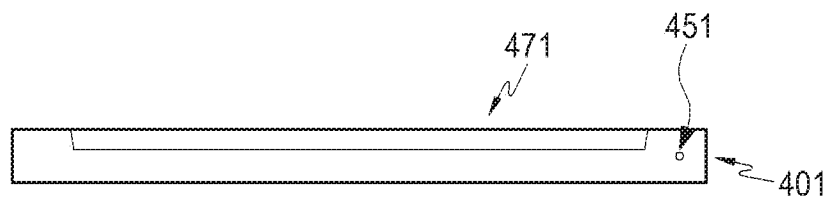
FIG. 4B is a side view illustrating an electronic device according to an embodiment of the present disclosure.

FIG. 4B is a side view illustrating an electronic device according to an embodiment of the present disclosure.

Referring to FIG. 4A, according to an embodiment of the present disclosure, the electronic device 400 may include a display 470. An illumination sensor 450 or RGB sensor 450 may be provided in an area (e.g., an upper area) of the display 470.

According to an embodiment of the present disclosure, the illumination sensor 450 or RGB sensor 450 may measure the ambient illumination of the display 470 of the electronic device 400 and may detect illumination-related data.

Referring to FIG. 4B, the illumination sensor 451 or RGB sensor 451 may be provided in a portion of a side area of the electronic device 401. The illumination sensor 451 or the RGB sensor 451 may be spaced apart from the display 471 of the electronic device 401 at a predetermined distance or more. The illumination sensor 451 or RGB sensor 451 may measure the illumination of an outside of the display 471 while spaced apart from the display 471 at a predetermined distance and detect the illumination-related data. According to an embodiment of the present disclosure, the electronic device 401 may have the display 471 and a plurality of illumination sensors or RGB sensors in an upper area or lower area of the display 471. The plurality of illumination sensors or RGB sensors are disposed in the upper area or lower area of the display 471 to measure the information around the upper or lower area of the display 471 and to detect illumination-related data.

According to an embodiment of the present disclosure, a plurality of illumination sensors or RGB sensors may be provided in a central portion of a side area of the electronic device 401. The illumination sensors or RGB sensors may be provided on the same plane parallel with the display 471 or may be provided inside the electronic device 401 on different planes.

Figure 5A:
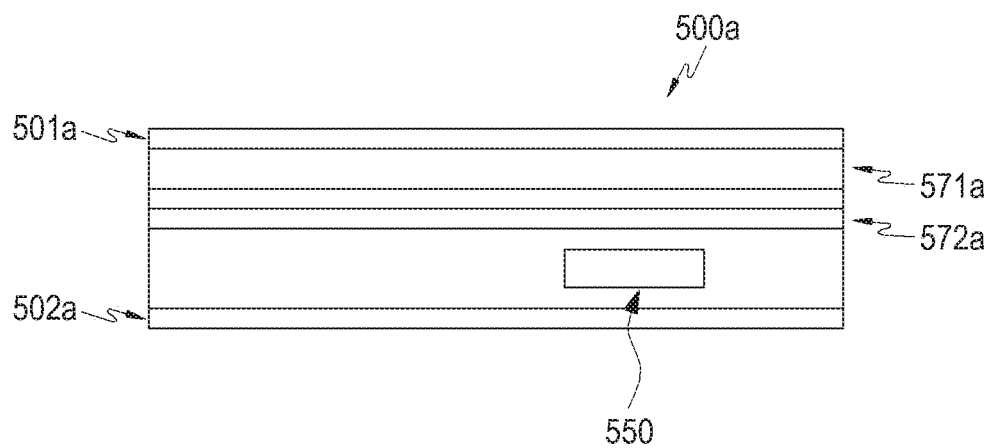
FIG. 5A is a side cross-sectional view illustrating an electronic device according to an embodiment of the present disclosure.

FIG. 5A is a side cross-sectional view illustrating an electronic device according to an embodiment of the present disclosure.

Referring to FIG. 5A, according to an embodiment of the present disclosure, the electronic device 500*a* may include a housing including a first surface (e.g., a glass surface) 501*a* and a second surface (e.g., a frame) facing in an opposite direction of the first surface 501*a*. According to an embodiment of the present disclosure, the electronic device 500*a* may include a display 571*a* including a plurality of pixels and exposed through the first surface. According to an embodiment of the present disclosure, the electronic device 500*a* may include a touch sensor 572*a* provided between the display 571*a* and the second surface 502*a*. According to an embodiment of the present disclosure, the electronic device 500*a* may include at least one or more illumination sensors 550 or RGB sensors arranged between the display 571*a* and the second surface 502*a*. According to an embodiment of the present disclosure, the illumination sensor 550 or the RGB sensor 550 may be disposed between the display 571*a* and the second surface 502*a*, and the illumination sensor 550 or RGB sensor 550 may simultaneously detect light outside the first surface 501*a* or light by image data output through the display 571*a* to obtain illumination-related data.

Figure 5B:
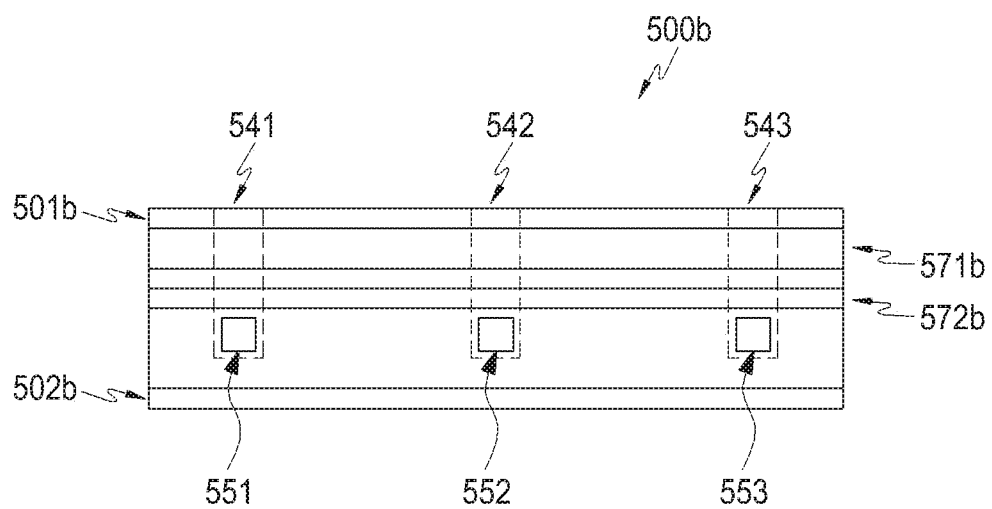
FIG. 5B is a side cross-sectional view illustrating an electronic device according to an embodiment of the present disclosure.

FIG. 5B is a side cross-sectional view illustrating an electronic device according to an embodiment of the present disclosure.

Referring to FIG. 5B, the electronic device 500*b* may include a first surface 501*b*, a second surface 502*b*, and a display 571*b* and touch sensor 572*b* provided between the first surface 501*b* and the second surface 502*b*. According to an embodiment of the present disclosure, the electronic device 500*b* may include a black layer including at least one opening 541, 542, and 543. For example, the black layer may be stacked in the display (e.g., the display 571*b*) configured of an OLED, and the black layer may be controlled to display a black screen on the display 571*b* together with a plurality of pixels.

According to an embodiment of the present disclosure, the electronic device 500*b* may include at least one illumination sensor 551, 552, and 553 or RGB sensor 551, 552, and 553 at least some of which are disposed inside at least one opening 541, 542, and 543. According to an embodiment of the present disclosure, the at least one illumination sensor 551, 552, and 553 or RGB sensor 551, 552, and 553 at least some of which are disposed in the at least one opening 541, 542, and 543 may detect light outside the first surface 501*b* or the display 571*b* through the opened space through the opening 541, 542, and 543 to obtain illumination-related data.

Figure 5C:
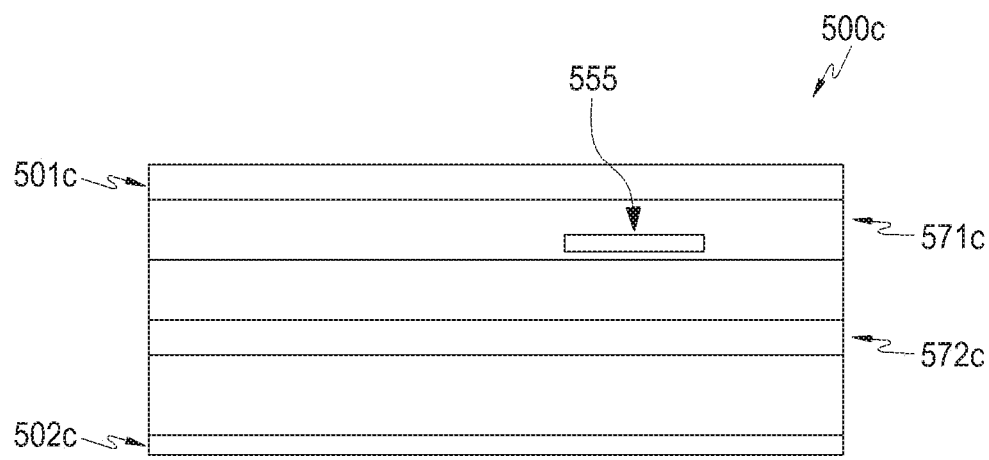
FIG. 5C is a side cross-sectional view illustrating an electronic device according to an embodiment of the present disclosure.

FIG. 5C is a side cross-sectional view illustrating an electronic device according to an embodiment of the present disclosure.

Referring to FIG. 5C, according to an embodiment of the present disclosure, the electronic device (e.g., the electronic device 500*c*) may include a first surface 501*c* and second surface 502*c* externally exposed, and a display 571*c* and touch sensor 572*c* provided between the first surface 501*c* and the second surface 502*c*. According to an embodiment of the present disclosure, the display 571*c* may include at least one or more illumination sensors 555 or RGB sensors 555 together with a plurality of pixels. For example, the illumination sensors 555 or RGB sensors 555 may be integrated with at least some of the plurality of pixels.

Figure 5D:
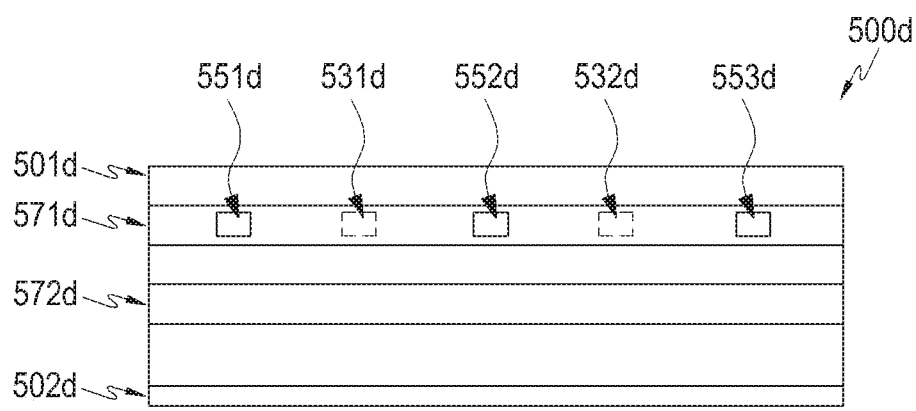
FIG. 5D is a side cross-sectional view illustrating an electronic device according to an embodiment of the present disclosure.

FIG. 5D is a side cross-sectional view illustrating an electronic device according to an embodiment of the present disclosure.

Referring to FIG. 5D, according to an embodiment of the present disclosure, the electronic device 500*d* may include a first surface 501*d* (e.g., a glass surface) externally exposed, a second surface 502*d* (e.g., a frame), and a display 571*d* and touch sensor 572*d* disposed between the first surface 501*d* and the second surface 502*d*, and the display 571*d* may include at least one or more pixels 551*d*, 552*d*, and 553*d*. According to an embodiment of the present disclosure, the display 571*d* may include at least one illumination sensor 531*d* and 532*d* integrated among at least one or more pixels 551*d*, 552*d*, and 553*d*.

According to an embodiment of the present disclosure, the position of the at least one illumination sensor 531*d* and 532*d* is not limited to that shown in FIG. 5D. For example, the at least one illumination sensor 531*d* and 532*d* may be disposed between the first surface 501*d* and the display 571*d*, embedded inside the display 571*d*, disposed adjacent to the display 571*d*, or disposed between the display 571*d* and the second surface 502*d*.

According to an embodiment of the present disclosure, the touch sensor 572*d* may be disposed between the first surface 501*d* and the display 571*d* or between the display 571*d* and the second surface 502*d*.

Figure 6:
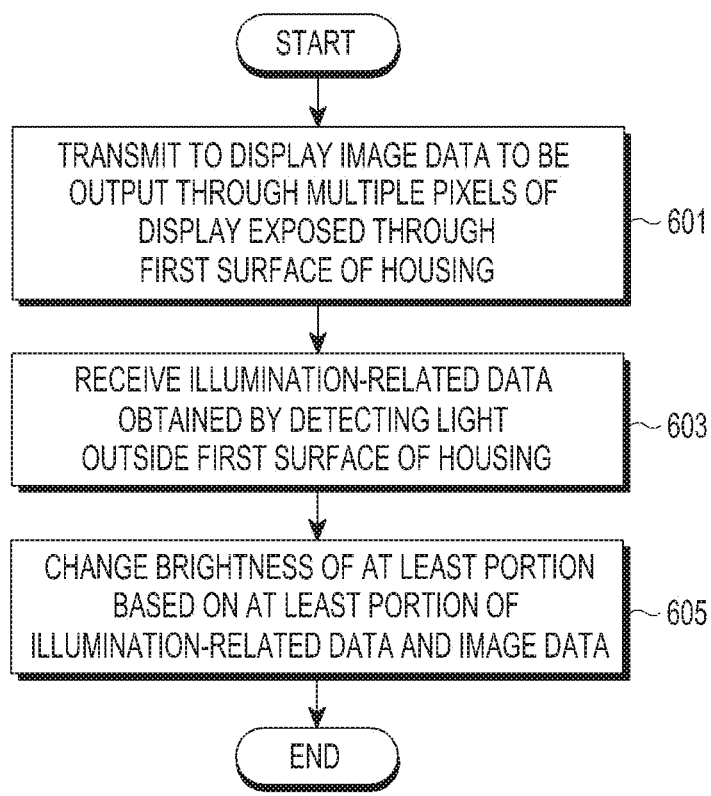
FIG. 6 is a flowchart illustrating a method for controlling an electronic device according to an embodiment of the present disclosure.

FIG. 6 is a flowchart illustrating a method for controlling an electronic device according to an embodiment of the present disclosure.

Referring to FIG. 6, according to an embodiment of the present disclosure, in operation 601, the processor (e.g., the processor 120) of the electronic device (e.g., the electronic device 500*a*) may transmit image data to be output through a plurality of pixels of the display (e.g., the display 571*a*) to the display 571*a* exposed through the first surface (e.g., the first surface 501*a*) of the housing.

According to an embodiment of the present disclosure, the processor 120 may monitor the amount of current consumed upon transmission of the image data to be output through the plurality of pixels.

In operation 603, the processor 120 may receive, through the illumination sensor (or RGB sensor), the illumination-related data obtained by detecting light outside the first surface of the housing through the illumination sensor (or RGB sensor).

In operation 605, the processor 120 may change the brightness of at least a portion of the display based on at least a portion of the image data and illumination-related data.

For example, the processor 120 may determine (or calculate) the illumination based on at least a portion of the image data and the illumination-related data and may change the brightness of at least a portion of the display based on the determined illumination.

Figure 7:
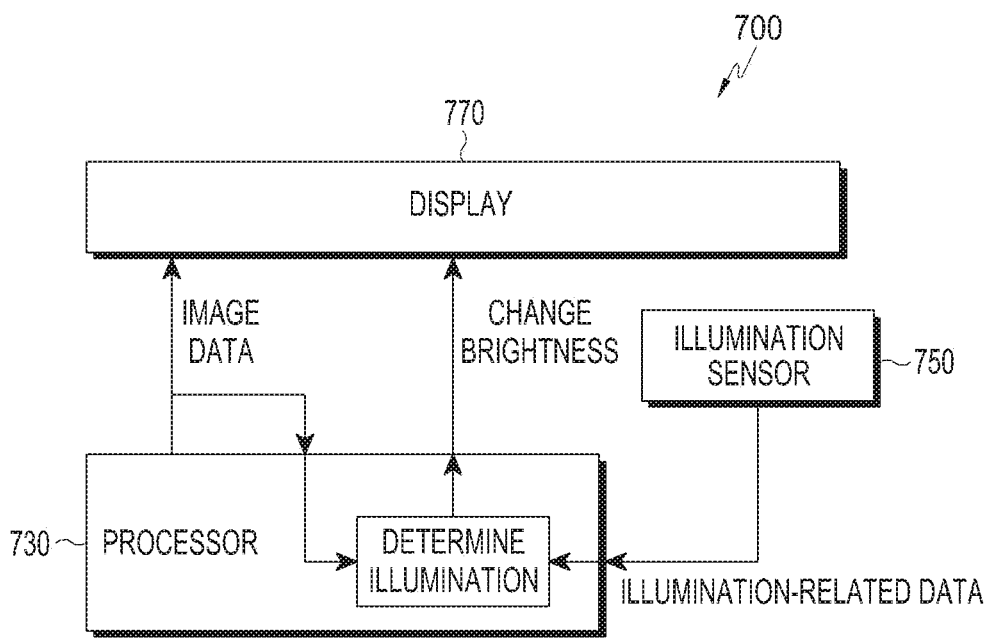
FIG. 7 is a block diagram illustrating an electronic device according to an embodiment of the present disclosure.

FIG. 7 is a block diagram illustrating an electronic device according to an embodiment of the present disclosure.

Referring to FIG. 7, the electronic device 700 may include a display 770 exposed through a first surface (e.g., the first surface 501a), an illumination sensor 750 (or RGB sensor) detecting light outside the first surface to obtain illumination-related data, and a processor 730, and although not shown in FIG. 7, the electronic device 700 may further include a memory (e.g., the memory 130) storing instructions necessary for the operation of the processor 730. According to an embodiment of the present disclosure, the electronic device 700 may generate a database for brightness control according to illuminations and may store the generated database in the memory 130. For example, the database may be a lookup table (LUT) including information on the correlation between illumination and brightness.

According to an embodiment of the present disclosure, the processor 730 may transmit image data to be output through a plurality of pixels in the display 770 to the display 770. According to an embodiment of the present disclosure, the processor 730 may receive illumination-related data obtained by detecting light outside the first surface using the illumination sensor 750. According to an embodiment of the present disclosure, the processor 730 may be configured to dynamically determine the illumination of at least a portion of the display 770 based on at least a portion of the transmitted image data and the received illumination-related data.

For example, the processor 730 may calculate RGB values accrued per gray level for each pixel of the image data, analyze the calculated RGB values, and output a result of the analysis. The processor 730 may identify at least one region of interest and reflect a weight corresponding to the identified region of interest to the output analysis result to output a final analysis result. The illumination of at least a portion of the display 770 may be determined based on at least a portion of the output final analysis result and illumination-related data.

According to an embodiment of the present disclosure, the processor 730 may change, in realtime, the brightness of the display 770 based on the determined illumination. According to an embodiment of the present disclosure, the processor 730 may change the brightness of the display 770 based on the determined illumination and the database (e.g., lookup table) stored in the memory 130.

Figure 8:
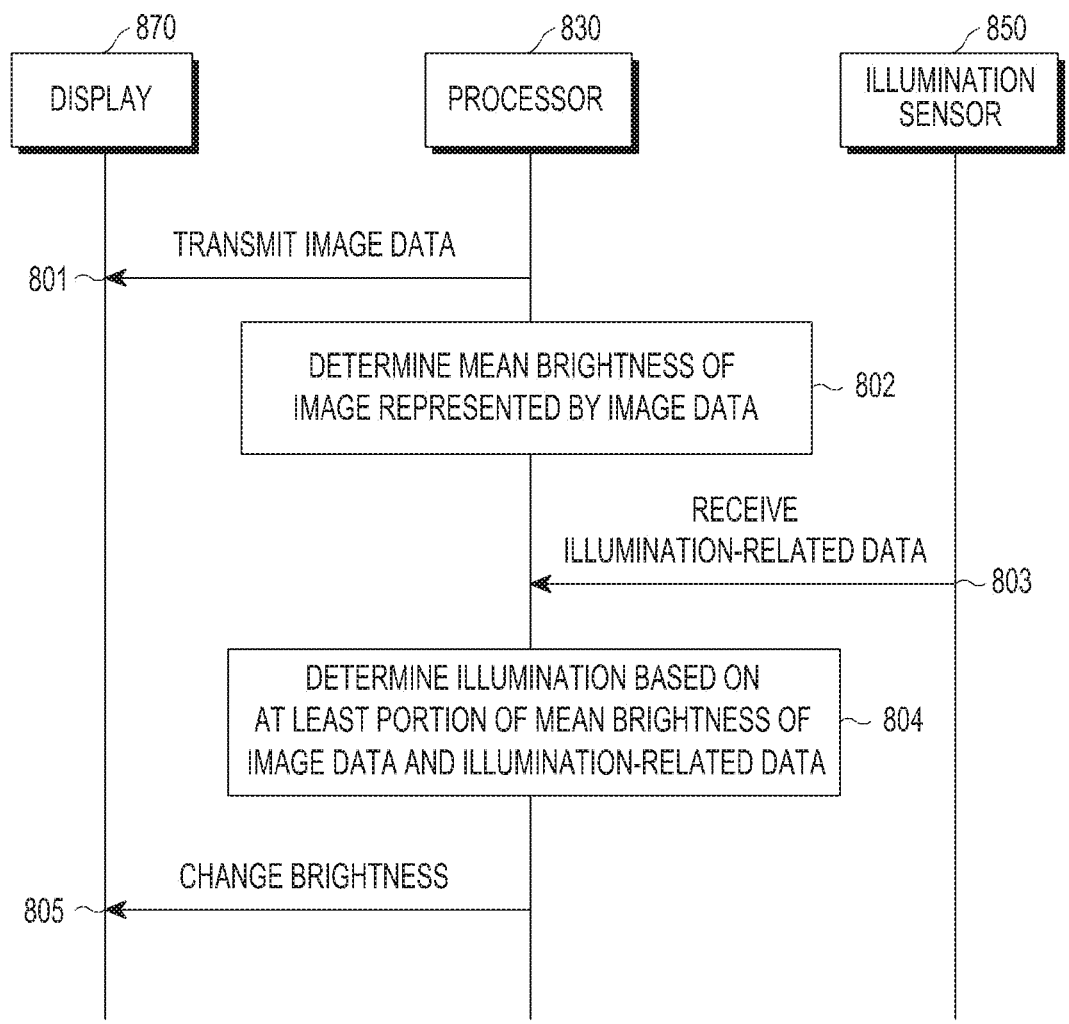
FIG. 8 is a flowchart illustrating an example of a method for controlling an electronic device according to an embodiment of the present disclosure.

FIG. 8 is a flowchart illustrating an example of a method for controlling an electronic device according to an embodiment of the present disclosure.

Referring to FIG. 8, according to an embodiment of the present disclosure, in operation 801, the processor 830 may transmit image data to be output through a plurality of pixels in the display 870 to the display 870.

According to an embodiment of the present disclosure, in operation 802, the processor 830 may calculate a mean brightness of images represented by the transmitted image data. For example, the processor 830 may determine the mean brightness of all of the plurality of pixels (all of the pixels in the frame) included in the image represented by the transmitted image data.

According to an embodiment of the present disclosure, in operation 803, the processor 830 may receive, from the illumination sensor 850, the illumination-related data obtained by detecting light outside the first surface where the display 870 is provided, using the illumination sensor 850. According to an embodiment of the present disclosure, after operation 801, the processor 830 may sequentially perform operations 803 and 802 and may then perform operation 804. That is, operation 803 and operation 802 may be reversed in order.

According to an embodiment of the present disclosure, in operation 804, the processor 830 may determine the illumination of the ambient environment based on at least a portion of the mean image brightness and the illumination-related data. The processor 830 may determine whether it should change the brightness of the display based on at least a portion of the ambient environment (e.g., illumination) of the display.

According to an embodiment of the present disclosure, in operation 805, the processor 830 may change the brightness of the display 870 based on at least a portion of the determined illumination information. When no illumination is determined in operation 804 or the brightness of the display 870 is determined not to be required to be changed, operation 805 might not be performed.

Figure 9:
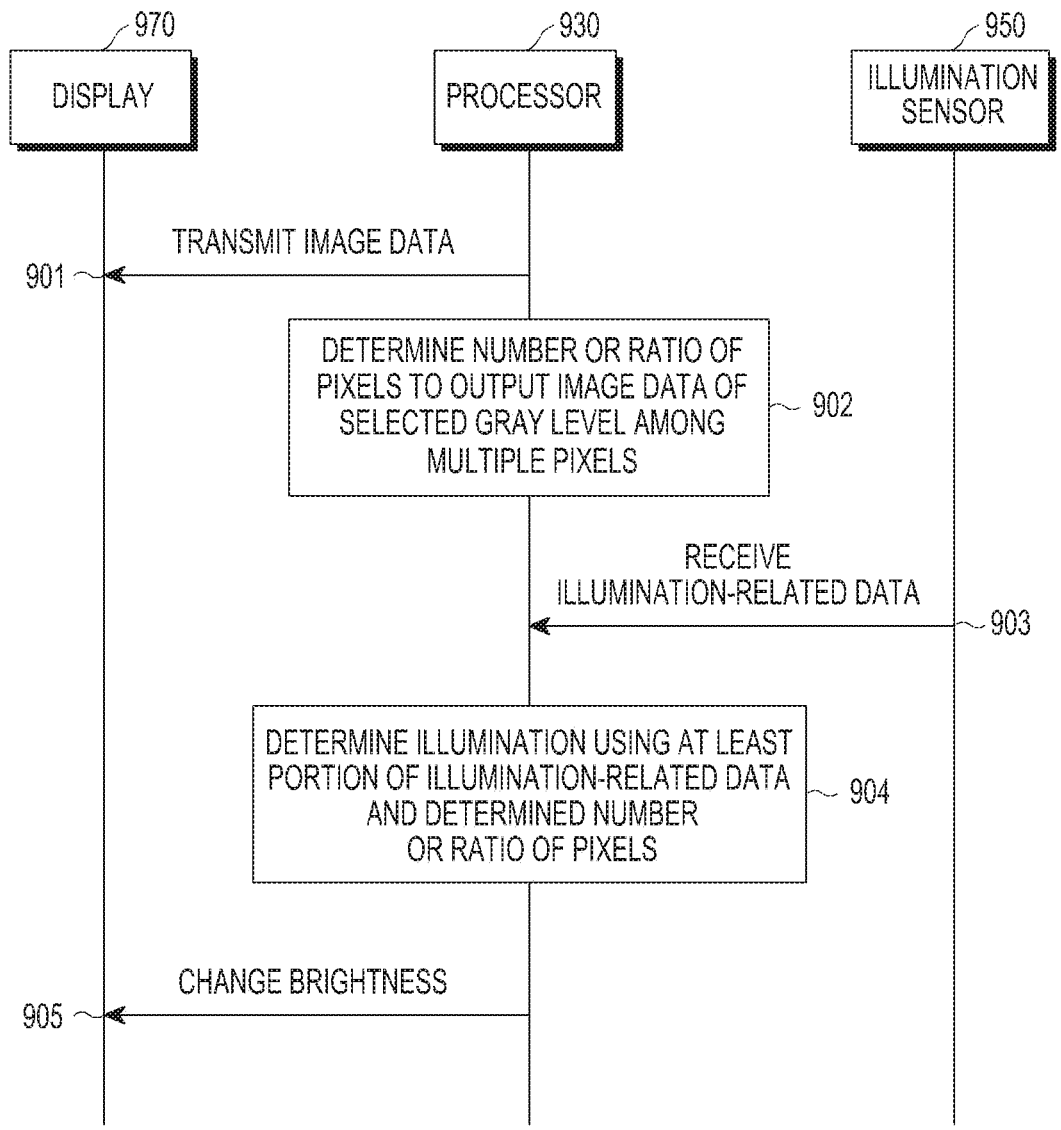
FIG. 9 is a flowchart illustrating an example of a method for controlling an electronic device according to an embodiment of the present disclosure.

FIG. 9 is a flowchart illustrating an example of a method for controlling an electronic device according to an embodiment of the present disclosure.

Referring to FIG. 9, according to an embodiment of the present disclosure, in operation 901, the processor 930 may transmit image data to the display 970.

According to an embodiment of the present disclosure, in operation 902, the processor 930 may determine the number or ratio (on pixel ratio (OPR) information) of pixels to output image data of a gray level (R, G, or B) selected from among a plurality of pixels in the display 970. For example, the OPR information may include information on the number of pixels (absolute number of pixels) or ratio of pixels to output image data among all of the pixels in the display 970.

According to an embodiment of the present disclosure, in operation 903, the processor 930 may receive illumination-related data from the illumination sensor 950. According to an embodiment of the present disclosure, after operation 901, the processor 930 may sequentially perform operations 903 and 902 and may then perform operation 904. That is, operation 903 and operation 902 may be reversed in order.

According to an embodiment of the present disclosure, in operation 904, the processor 930 may determine the illumination of an ambient environment using at least a portion of the illumination-related data, pixel ratio, or number of pixels determined. The processor 930 may determine whether it should change the brightness of the display based on at least a portion of the ambient environment (e.g., illumination) of the display.

According to an embodiment of the present disclosure, in operation 905, the processor 930 may change the brightness of the display 970 based on at least a portion of the determined illumination information. When in operation 904 no illumination is determined or the brightness of display 970 is determined not to be required to be changed, operation 905 might not be performed.

Figure 10:
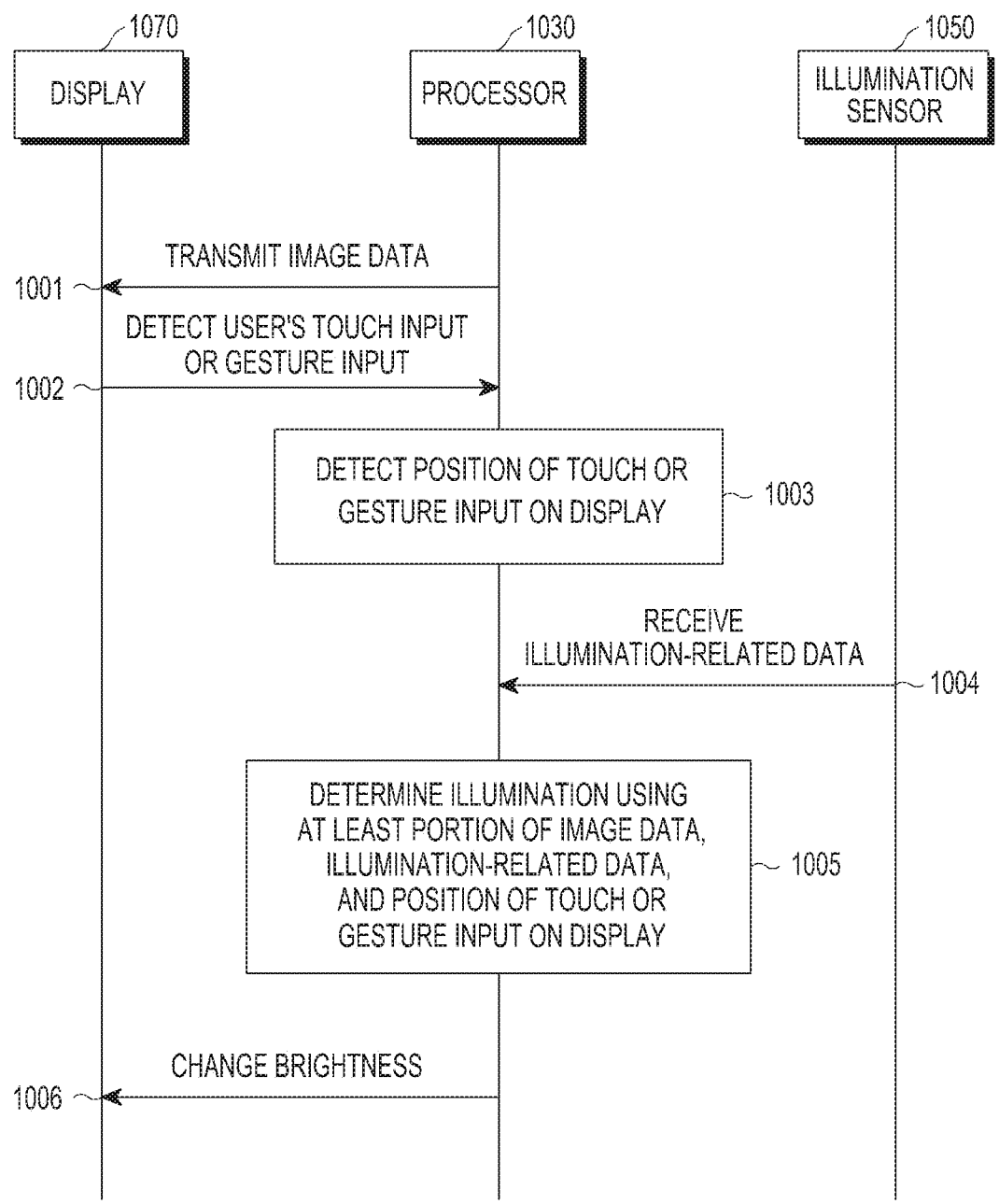
FIG. 10 is a flowchart illustrating an example of a method for controlling an electronic device according to an embodiment of the present disclosure.

FIG. 10 is a flowchart illustrating an example of a method for controlling an electronic device according to an embodiment of the present disclosure.

Referring to FIG. 10, according to an embodiment of the present disclosure, in operation 1001, the processor 1030 may transmit image data to the display 1070.

According to an embodiment of the present disclosure, in operation 1002, the processor 1030 may sense a touch input or gesture input of the user through the display 1070.

According to an embodiment of the present disclosure, in operation 1003, the processor 1030 may sense the position of the touch or gesture input on the display 1070. According to an embodiment of the present disclosure, after operations 1001 and 1002, the processor 1030 may perform operation 1003 and may sequentially perform operations 1001 and 1002. That is, operation 1003 and operation 1002 may be reversed in order.

According to an embodiment of the present disclosure, in operation 1004, the processor 1030 may receive illumination-related data from the illumination sensor 1050.

According to an embodiment of the present disclosure, in operation 1005, the processor 1030 may determine the illumination using at least a portion of the image data and illumination-related data and the position of the touch or gesture input on the display. That is, the processor 1030 may determine the current illumination to fit the ambient environment (e.g., illumination) of the display.

According to an embodiment of the present disclosure, when the illumination is determined in operation 1005, the processor 1030 may change the brightness of the display 1070 based on the determined illumination. When no illumination is determined in operation 1005 or the brightness of the display 1070 is determined not to be required to be changed, operation 1006 might not be performed.

According to an embodiment of the present disclosure, the processor 1030 might not use the illumination information received from at least some illumination sensor 1050 present on the display 1070 as information for determining the illumination information on the external environment. For example, the processor 1030 might not reflect the information received from the illumination sensor 1050 present at a position on the display 1070 to which the touch input or gesture input is applied as the illumination-related data but may reflect illumination-related data at a position on the display 1070 other than a position where the touch input or gesture input is applied.

Figure 11:
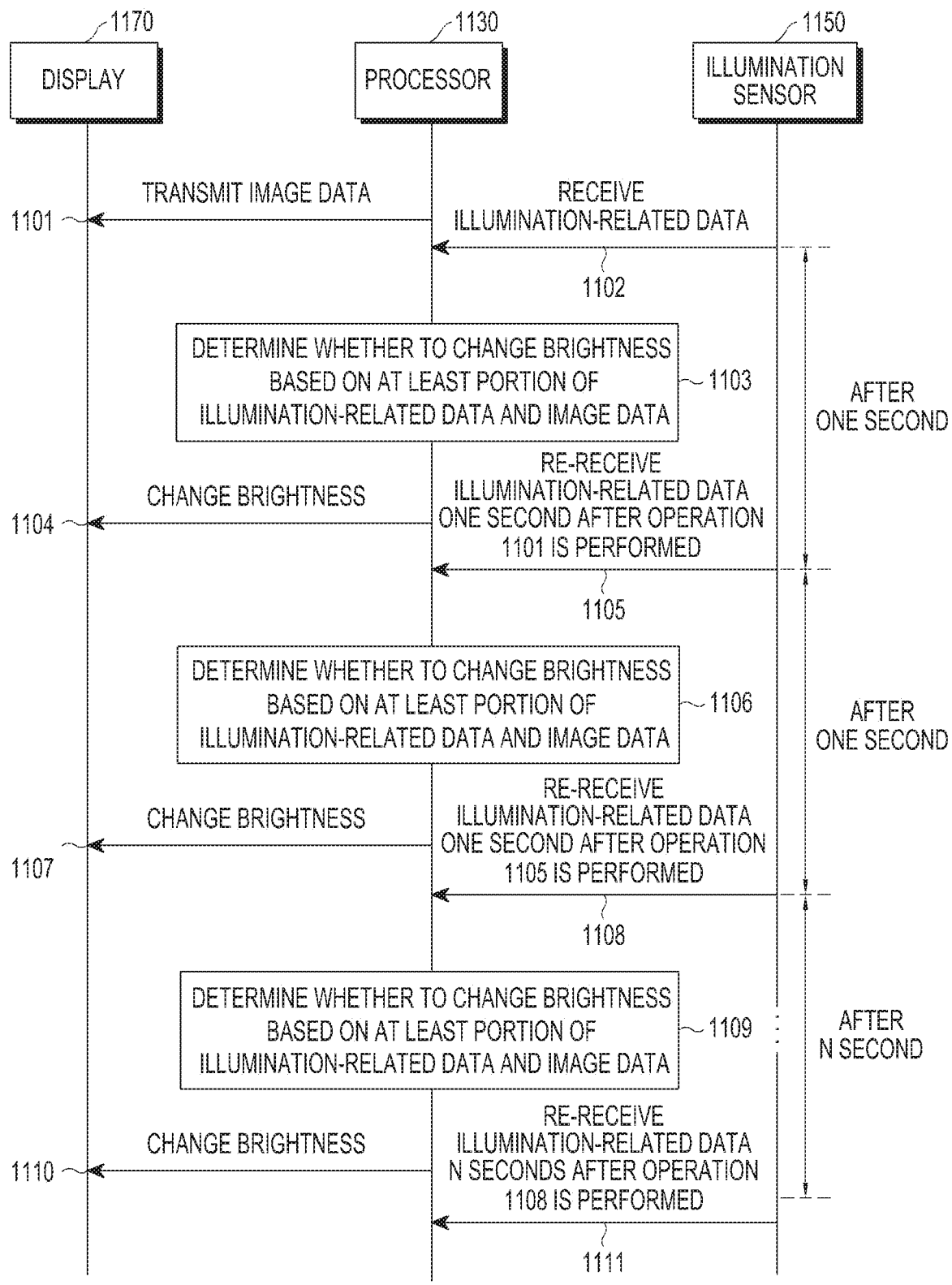
FIG. 11 is a flowchart illustrating an example of a method for controlling an electronic device according to an embodiment of the present disclosure.

FIG. 11 is a flowchart illustrating an example of a method for controlling an electronic device according to an embodiment of the present disclosure.

Referring to FIG. 11, according to an embodiment of the present disclosure, in operation 1101, the processor 1130 may transmit image data to be output through the display 1170.

According to an embodiment of the present disclosure, in operation 1102, the processor 1130 may receive, from the illumination sensor 1150, the illumination-related data obtained by detecting light outside the first surface exposing the display 1170 through the illumination sensor 1150.

According to an embodiment of the present disclosure, in operation 1103, the processor 1130 may determine whether to change brightness based on at least a portion of the image data and illumination-related data, and in operation 1104, the processor 1130 may change the brightness of the display 1170 upon determining that the brightness of display 1170 is required based on the information on the image and illumination-related data.

According to an embodiment of the present disclosure, at a predetermined time (e.g., 1 second) after operation 1102 is performed, the processor 1130 may receive again, from the illumination sensor 1150, the illumination-related data obtained by detecting light outside the first surface exposing the display 1170 through the illumination sensor 1150 in operation 1105, and the processor 1130 may determine whether to change brightness based on at least a portion of the image data and illumination-related data in operation 1106 in the same manner as operation 1103, and the processor 1130 may change the brightness of the display 1170 upon determining that the brightness of the display 1170 is required to be changed based on the illumination-related data and information on the image data in operation 1107 in the same manner as operation 1104.

According to an embodiment of the present disclosure, at a predetermined time (e.g., 1 second) after operation 1105 is performed, the processor 1130 may receive again, from the illumination sensor 1150, the illumination-related data obtained by detecting light outside the first surface exposing the display 1170 through the illumination sensor 1150 in operation 1108, and the processor 1130 may determine whether to change brightness based on at least a portion of the image data and the illumination-related data in operation 1109 in the same manner as operation 1106 and may change the brightness of the display 1170 based on the changed illumination in operation 1110 upon determining that the brightness of the display 1170 is required to be changed in the same manner as operation 1107.

According to an embodiment of the present disclosure, in operation 1111, while N seconds elapse after operation 1108 is performed, the processor 1130 may re-receive the illumination-related data obtained by detecting light outside the first surface exposing the display 1170 through the illumination sensor 1150 from the illumination sensor 1150 every second and may repeatedly perform the operation of determining illumination and changing brightness every second.

As described above in connection with FIG. 11, the processor 1130 may receive illumination-related data at the period of one second and may change brightness based on the received illumination-related data and previously transmitted image data. According to an embodiment of the present disclosure, the processor 1130 may periodically collect illumination data and image data and determine whether to change brightness based on the collected illumination data and image data. For example, when a variation in the illumination data and image data is smaller than a predetermined value, the processor 1130 may change, in realtime, the period of collecting illumination data and image data (e.g., from 1 second to 1 second, from one second to 1.5 seconds, from 1.5 seconds to 1.5 seconds, or from 1.5 seconds to 2 seconds).

Figure 12:
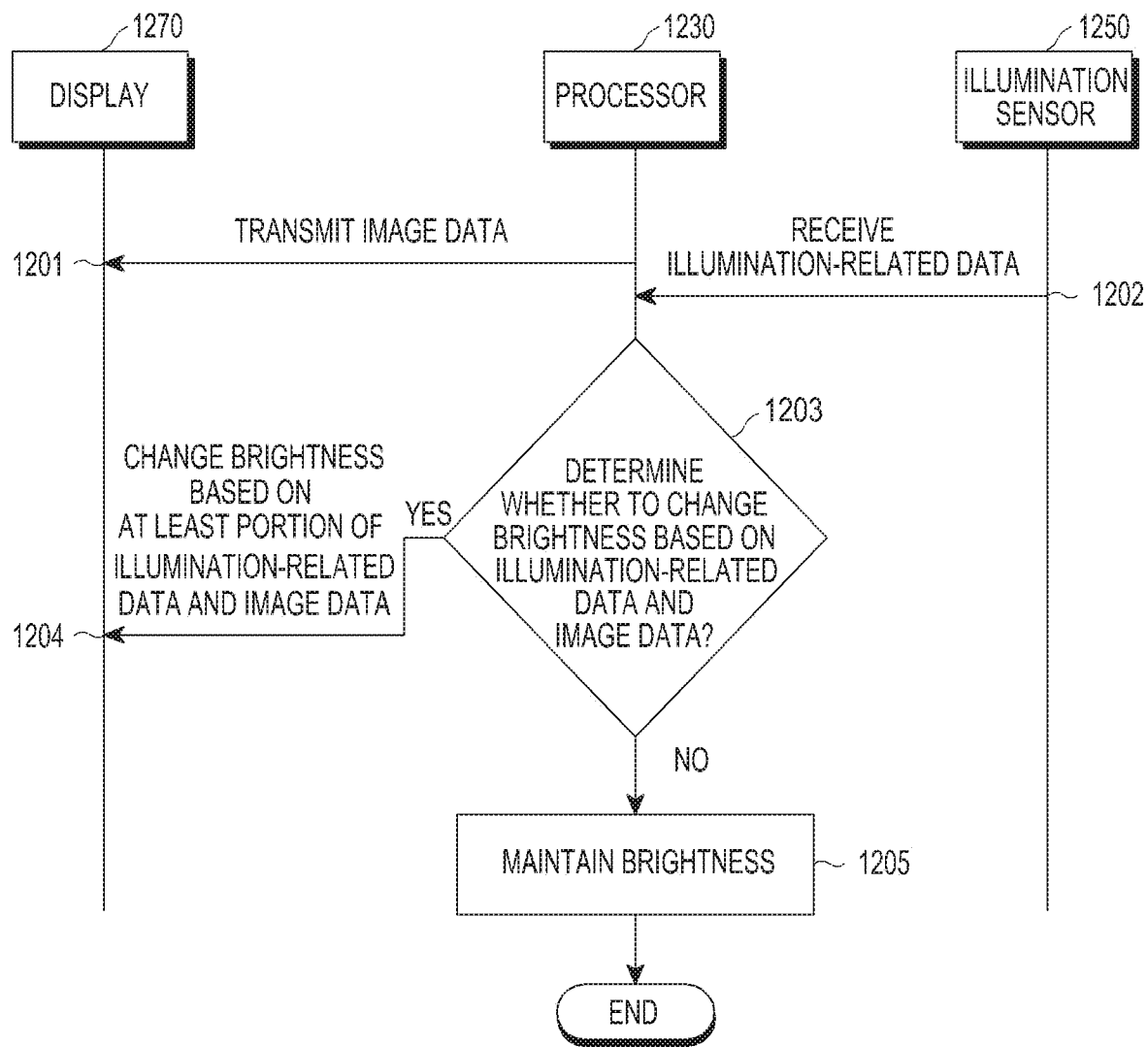
FIG. 12 is a flowchart illustrating an example of a method for controlling an electronic device according to an embodiment of the present disclosure.

FIG. 12 is a flowchart illustrating an example of a method for controlling an electronic device according to an embodiment of the present disclosure.

Referring to FIG. 12, in operation 1201, the processor 1230 may transmit image data to be output through a plurality of pixels of the display 1270 to the display 1270, and in operation 1202, the processor 1230 may receive illumination-related data obtained by detecting light outside the first surface exposing the display 1270 using the illumination sensor 1250.

According to an embodiment of the present disclosure, in operation 1203, the processor 1230 may determine whether to change the brightness of the display 1270 based on the received illumination-related data and the transmitted image data.

For example, when the received illumination-related data which is not less than a predetermined illumination is detected, and thus, the environment around the electronic device is determined to be a "high illumination," "outdoor,"

or "daytime," the processor 1230 may determine not to change but to maintain the brightness of the display 1270. For example, when the received illumination-related data which is not more than a predetermined illumination is detected, and thus, the environment around the electronic device is determined to be a "low illumination," "indoor," or "nighttime," the processor 1230 may determine to change (or reduce) the brightness of the display 1270.

For example, when the image data not less than the amount of reference image data is transmitted during a predetermined time, the processor 1230 may determine that the display 1270 turns on and determine to change the brightness of the display 1270. For example, when the image data not more than the amount of reference image data is transmitted during a predetermined time, the processor 1230 may determine that the display 1270 turns off and determine to maintain the brightness.

For example, when determined that the mean brightness (or OPR information) of the image data is not less than a preset brightness, so that the environment of the front surface of the electronic device is determined to be "high illumination," "outdoor," or "daytime," the processor 1230 may maintain the brightness so that the brightness of the display 1270 is not changed. For example, when determined that the mean brightness of the image data is not more than a preset brightness, so that the environment of the front surface of the electronic device is determined to be "low illumination," "indoor," or "nighttime," the processor 1230 may change (e.g., reduce) the brightness of the display 1270.

According to an embodiment of the present disclosure, in operation 1204, when determined to change the brightness of the display 1270, the processor 1230 may change the brightness based on at least a portion of image data and illumination-related data.

According to an embodiment of the present disclosure, in operation 1205, when determined to maintain the brightness of the display 1270, the processor 1230 may maintain the existing brightness.

Operations 1201 to 1205 may be repeated at a predetermined period (e.g., one second) and may be repeatedly performed at the changed period based on, e.g., information on the ambient environment of the electronic device.

Figure 13:
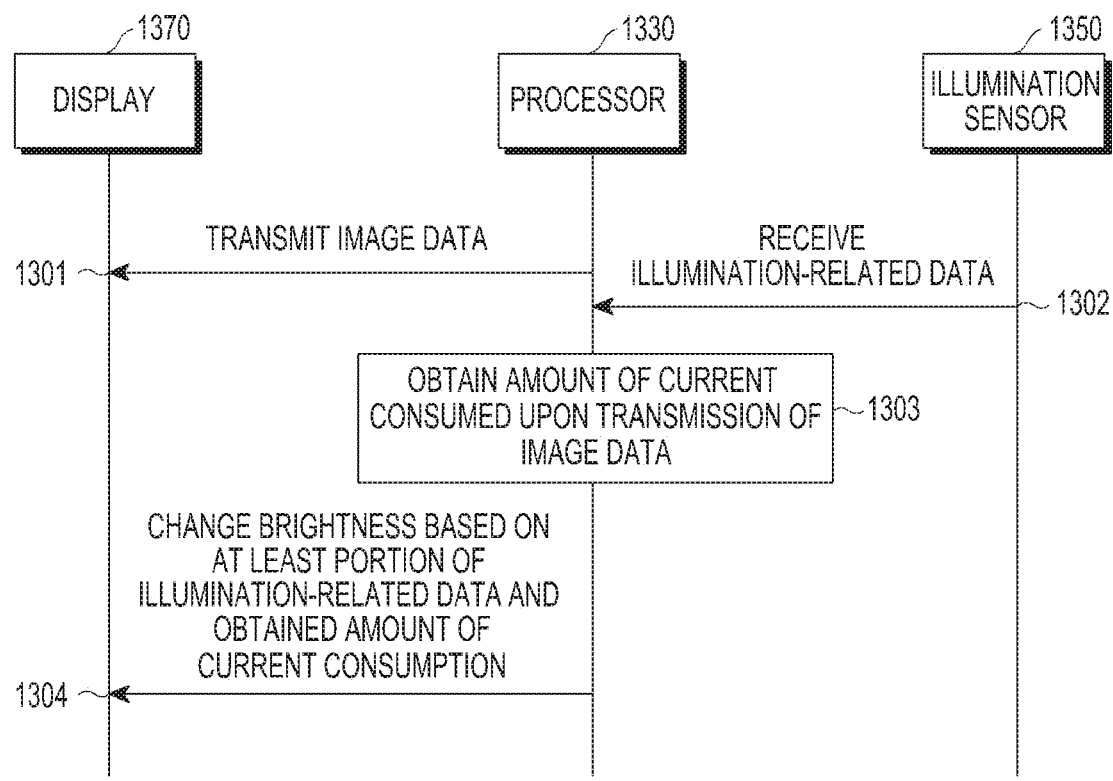
FIG. 13 is a flowchart illustrating an example of a method for controlling an electronic device according to an embodiment of the present disclosure.

FIG. 13 is a flowchart illustrating an example of a method for controlling an electronic device according to an embodiment of the present disclosure.

Referring to FIG. 13, according to an embodiment of the present disclosure, in operation 1301, the processor 1330 may transmit image data to the display 1370, and in operation 1302, the processor 1330 may receive illumination-related data from the illumination sensor 1350.

According to an embodiment of the present disclosure, in operation 1303, the processor 1330 may obtain information on the amount of current consumed when transmitting image data or the transmitted image data. The amount of the transmitted image data may be proportional to the amount of current consumed upon transmission of the image data.

According to an embodiment of the present disclosure, in operation 1304, the processor 1330 may change brightness based on at least a portion of the obtained amount of consumed current and illumination-related data.

For example, since the amount of image data is proportional to the amount of current consumed upon transmission of the image data, the processor 1330, when determining that the obtained amount of consumed current is not less than a preset current amount, may determine that the amount of the transmitted image data is not less than a preset amount of image data and may determine whether to change brightness based on the same. As another example, when the same amount of current is consumed during a predetermined time, the processor 1330 may determine that there is no variation in image data to increase the period of calculation for the image data or to change illumination based on the illumination-related data.

Figure 14:
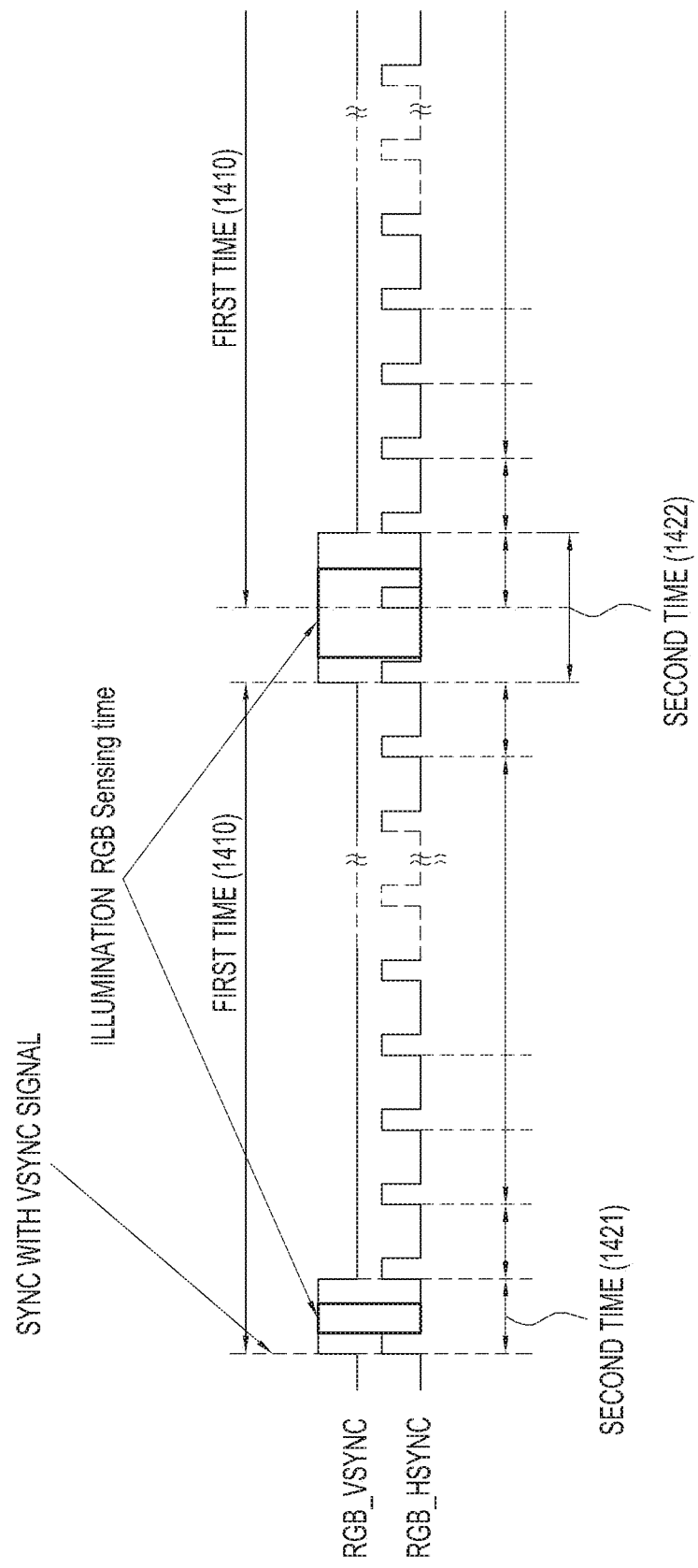
FIG. 14 is a view illustrating a method for detecting illumination-related data according to an embodiment of the present disclosure.

FIG. 14 is a view illustrating a method for detecting illumination-related data according to an embodiment of the present disclosure.

Referring to FIG. 14, according to an embodiment of the present disclosure, the processor (e.g., the processor 120) of the electronic device (e.g., the electronic device 101) may transmit image data to be output through a plurality of pixels of the display 160 to the display (e.g., the display 160) of the electronic device 101, at the period of a preset first time 1410, during a second time 1421 and 1422.

For example, the processor 120 may transmit, to the display 160, a separate vertical frame sync signal of image (RGB_VSYNC) signal and horizontal frame sync signal of image (RGB_HSYNC). For example, the first time interval may be a time gap from a first time when the RGV_VSYNC signal starts a first output to a second time when a second output is started.

For example, the first time 1410 may be a period between the times set to transmit one frame (RGB_VSYNC) of the image data. For example, the first time 1410 may be ¹⁄₆₀ seconds.

For example, the second time 1421 (e.g., a first output period) and the second time 1422 (e.g., a second output period) may be periods during which a particular screen (e.g., a whole black or white screen) of the image data is output through the display 160.

According to an embodiment of the present disclosure, the display 160 may receive image data from the processor 120 during the second times 1421 and 1422 of the first time 1410, a particular screen (e.g., a whole black or white screen) during the second times 1421 and 1422, and the image data received through the plurality of pixels during the remainder of the first time 1410 except for the second times 1421 and 1422.

According to an embodiment of the present disclosure, the processor 120 may detect light outside the first surface of the housing of the electronic device using the illumination sensor during a time other than the second times based on the time when the RGB_VSYNC signal is output and/or the time when the image data is transmitted, thereby receiving illumination-related data.

According to an embodiment of the present disclosure, when detecting light (e.g., illumination) outside the display 160 of the electronic device 101, the electronic device 101 may detect the light outside the display 160 during a particular period (the second times 1421 and 1422) during which no image is output through the display 160 as described in connection with FIG. 14, and the electronic device 101 may control the brightness of the display 160 using the light (illumination) outside the display 160 detected during the particular period (the second times 1421 and 1422) when no image is output. Accordingly, an error in illumination detection may be addressed which may be caused by the brightness of image output through the display 160.

Figure 15:
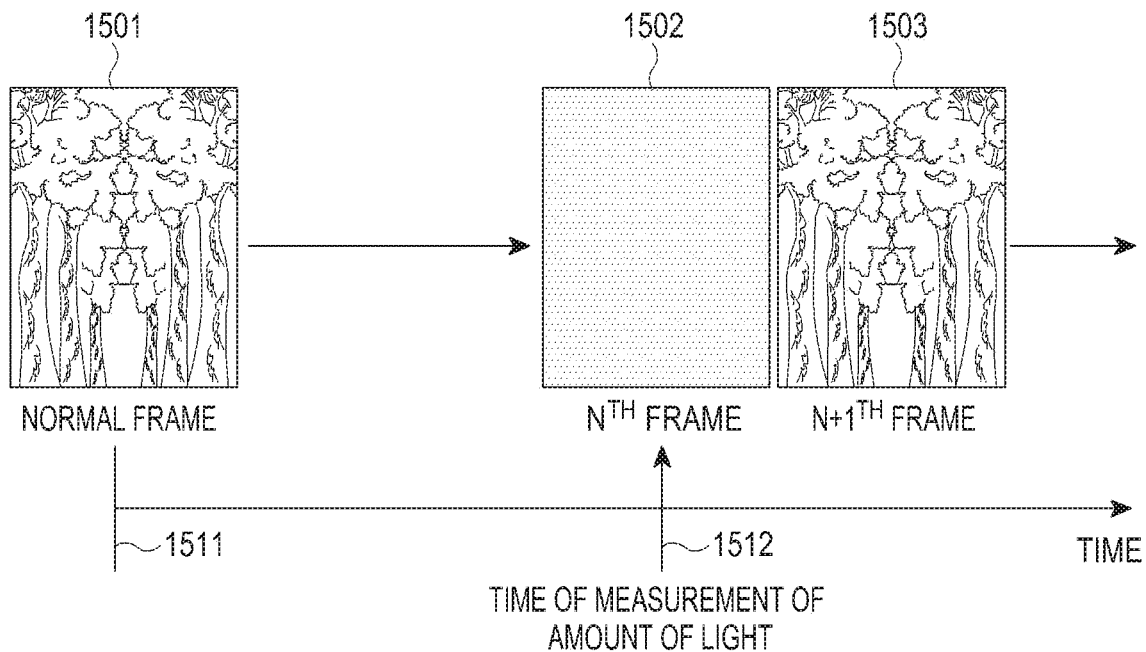
FIG. 15 is a view illustrating a method for detecting illumination-related data according to an embodiment of the present disclosure.

FIG. 15 is a view illustrating a method for detecting illumination-related data according to an embodiment of the present disclosure.

Referring to FIG. 15, according to an embodiment of the present disclosure, the processor (e.g., the processor 120) of the electronic device may transmit a normal frame 1501, an Nth frame 1502, and/or an N+1th frame 1503 to the display (e.g., the display 160) to be output through a plurality of pixels.

For example, the Nth frame 1502 may be a frame allowing the overall area of the display 160 to be output as a mean brightness (or mean color or mean gray level value) included in the normal frame 1501 and/or the N+1th frame 1503.

According to an embodiment of the present disclosure, the processor 120 may transmit the Nth frame 1502 to the display 160 to output, through the plurality of pixels, the Nth frame 1502 allowing the overall area of the display 160 to be output as the mean brightness (or mean color or mean gray level value) included in the normal frame 1501 and/or the N+1th frame 1503 at a particular time (e.g., a time of measuring the amount of light) 1512 for detecting illumination-related data.

According to an embodiment of the present disclosure, after the time 1511 when at least one normal frame 1501 is output through a plurality of pixels, when the Nth frame 1502 is transmitted to the display 160 to output, through the plurality of pixels, the Nth frame 1502 allowing the overall area of the display 160 to be output as the mean brightness (or mean color or mean gray level value) included in the normal frame 1501 and/or the N+1th frame 1503 at a particular time (e.g., a time of measuring the amount of light) 1512 for detecting illumination-related data, the processor 120 may detect and receive illumination-related data outside the display 160 through the illumination sensor at the time 1512 when the Nth frame 1502 starts to be output.

Figure 16:
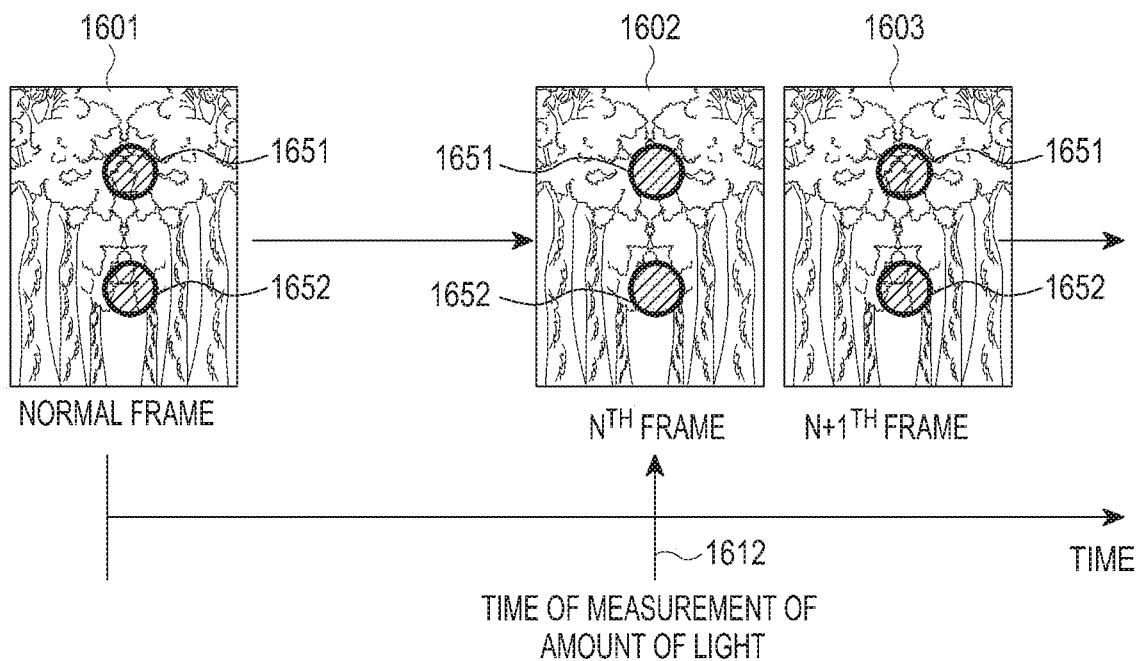
FIG. 16 is a view illustrating a method for detecting illumination-related data according to an embodiment of the present disclosure.

FIG. 16 is a view illustrating a method for detecting illumination-related data according to an embodiment of the present disclosure.

Referring to FIG. 16, according to an embodiment of the present disclosure, the processor (e.g., the processor 120) of the electronic device may transmit a normal frame 1601, an Nth frame 1602, and/or an N+1th frame 1603 to the display (e.g., the display 160) to be output through a plurality of pixels.

For example, the Nth frame 1602 may be a frame allowing the mean brightness (or mean color or mean gray level value) included in the normal frame 1501 and/or the N+1th frame 1503 to be output only on some areas 1651 and 1652 corresponding to the position where the illumination sensor is embedded in the overall area of the display 160 and including the same image data as that in the area corresponding to the normal frame 1501 and/or the N+1th frame 1503 in the remaining area except for the regions 1651 and 1652.

According to an embodiment of the present disclosure, at a particular time (e.g., the time of measuring the amount of light) 1612 for detecting illumination-related data, the processor 120 may transmit the Nth frame 1602 to the display 160 to output the Nth frame 1602 through a plurality of pixels, which allows the mean brightness (or mean color or mean gray level value) included in the normal frame 1601 and/or the N+1th frame 1603 to be output only on some areas 1651 and 1652 corresponding to the position where the illumination sensor is embedded in the overall area of the display 160 and including the same image data as that in the area corresponding to the normal frame 1601 and/or the N+1th frame 1603 in the remaining area except for the regions 1651 and 1652.

According to an embodiment of the present disclosure, at a particular time (e.g., the time of measuring the amount of light) 1612 for detecting illumination-related data, when the processor 120 transmits the Nth frame 1602 to the display 160 to output the Nth frame 1602 through a plurality of pixels, which allows the mean brightness (or mean color or mean gray level value) included in the normal frame 1601 and/or the N+1th frame 1603 to be output only on some areas 1651 and 1652 corresponding to the position where the illumination sensor is embedded in the overall area of the display 160 and including the same image data as that in the area corresponding to the normal frame 1601 and/or the N+1th frame 1603 in the remaining area except for the regions 1651 and 1652, the processor 120 may detect and receive, through the illumination sensor, illumination-related data outside the display 160 at the time 1612 when the Nth frame 1602 is output.

According to an embodiment of the present disclosure, the processor 120 may detect and receive the illumination-related data outside the display 160 using the illumination sensor provided at a position corresponding to the areas 1651 and 1652 of the Nth frame 1602 at the time 1612 of measuring the amount of light, and the processor 120 may change the brightness of the display 160 based on the received illumination-related data and the database (e.g., the lookup table including the information regarding the relation between illumination-related data and brightness) stored in the memory (e.g., the memory 130).

For example, assuming that, of the detected illumination-related data, the strength of a red wavelength (the gray level of a red color) is R, the strength of a green wavelength (the gray level of a green color) is G, the strength of a blue wavelength (the gray level of a blue color) is B, a predetermined constant for determining the red wavelength is a, a predetermined constant for determining the green wavelength is b, a predetermined constant for determining the blue wavelength is c, and an illumination by image data output through the display 160 as calculated based on the database stored in the memory 130 is d, the illumination of the display 160 may be a*R+b*G+c*B−d.

According to an embodiment of the present disclosure, upon displaying a first area including a first gray level and a first color and a second area including a second gray level and the first color of some areas 1651 and 1652 corresponding to the position where the illumination sensor is embedded in the overall area of the display 160, the processor 120 may calculate a mean value of the first color output by a plurality of pixels in the areas and output the areas with the mean value of the first color with respect to one gray level with a weight of 50% or more of the first gray level and the second gray level or one gray level having a weight close to 50% of the first gray level and the second gray level.

According to an embodiment of the present disclosure, when the first area including the first color of the first gray level and the second area including the first color of the first gray level are displayed on some areas 1651 and 1652 corresponding to the position where the illumination sensor is embedded in the overall area of the display 160, the processor 120 may calculate a mean value of the first color output by a plurality of pixels in the areas 1651 and 1652 and output the areas 1651 and 1652 using the calculated first color mean value as the first gray level.

According to an embodiment of the present disclosure, when the first area including the first color of the first gray level and the second area including the second color of the second gray level are displayed on some areas 1651 and 1652 corresponding to the position where the illumination sensor is embedded in the overall area of the display 160, the processor 120 may calculate a mean value of the first color and the second color output by a plurality of pixels and may output the areas 1651 and 1652 with the mean color value of the first color and the second color with respect to one gray level with a weight of 50% or more of the first gray level and the second gray level or one gray level having a weight close to 50% of the first gray level and the second gray level.

Figure 17:
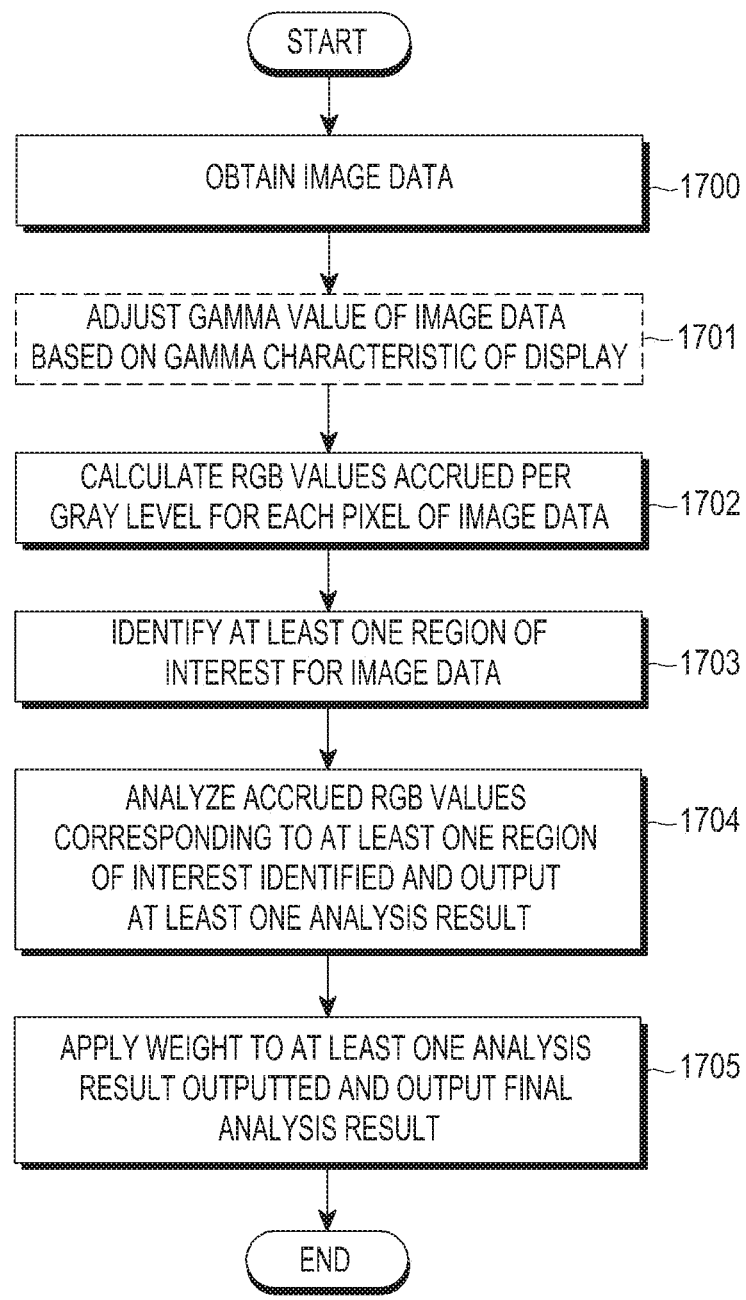
FIG. 17 is a flowchart illustrating an example of a method for analyzing image data according to an embodiment of the present disclosure.

FIG. 17 is a flowchart illustrating an example of a method for analyzing image data according to an embodiment of the present disclosure.

According to an embodiment of the present disclosure, operations 1700 to 1705 may be performed through any one of the electronic device 101, 102, 104, 201, or 400, the server 106, at least one processor 120, 210, 730, 830, 930, 1030, 1130, 1230, or 1330 (e.g., at least one of an AP, a GPU, and an image signal processor), and the program module 310.

Referring to FIG. 17, the electronic device 400 may obtain image data in operation 1700 and may adjust the gamma value of the obtained image data based on a gamma characteristic of a display (e.g., the display 470, 471, 571*a*, 571*b*, 571*c*, 571*d*, 770, 870, 970, 1070, 1170, 1270, or 1370) in operation 1701. For example, the electronic device 400 may obtain the image data through an image sensor or download the image data from an external electronic device. Further, operation 1701 may be selectively or optionally performed.

In operation 1702, the electronic device 400 may calculate RGB values accrued per gray level for each pixel of the image data. According to an embodiment of the present disclosure, the electronic device 400 may identify RGB values for each pixel and accrue the identified RGB values to produce the calculated accrued RGB values. For example, the electronic device 400 may accrue as many RGB values as the number of pixels corresponding to the resolution of the image data.

According to an embodiment of the present disclosure, the electronic device 400 may apply the same or different weight to each pixel based on a response characteristic for each RGB pixel of an illumination sensor (e.g., the illumination sensor 240*k*, 450, 451, 550, 551, 552, 553, 555, 750, 850, 950, 1050, 1150, 1250, or 1350 or a RGB sensor) and calculate weight-applied accrued RGB values.

In operation 1703, the electronic device 400 may identify at least one region of interest (ROI) for the image data. According to an embodiment of the present disclosure, the electronic device 400 may set at least a portion of the image data as a region of interest with a particular size according to the purpose of use. A plurality of regions of interest with different sizes and a particular shape (e.g., a concentric shape) may be formed. For example, a region of interest may be set based on the field of view (FOV) of the illumination sensor 450 positioned at a lower end of the display. Upon determining that a large characteristic variation occurs at a border of the field of view (e.g., when the color value is subject to a significant change), the electronic device 400 may set a plurality of regions of interest.

In operation 1704, the electronic device 400 may analyze the accrued RGB values corresponding to at least one region of interest identified and output at least one analysis result.

In operation 1705, the electronic device 400 may apply a weight to the, at least one, analysis result as outputted, outputting a final analysis result. According to an embodiment of the present disclosure, the electronic device 400 may set the same or different weight for each of the, at least one, region of interest. When the analysis result for each of the, at least one, region of interest is calculated, the electronic device 400 may apply a weight set corresponding to each region of interest to the analysis result, outputting a weight-applied final analysis result. For example, when the respective analysis results for a plurality of regions of interest are calculated, the electronic device 400 may output, as the final analysis result, a summation of the regions of interest to which their respective weight have been applied.

Thus, the electronic device 400 may change the brightness of the display 770 based on at least a portion of the outputted final analysis result and illumination-related data.

According to an embodiment of the present disclosure, the image data analysis method may be used where the illumination sensor 450 is disposed on the rear surface (or at a lower portion) of the display 470.

According to an embodiment of the present disclosure, the electronic device 400 may also analyze the image data based on values obtained by accruing YUV(YCbCr) values for each pixel of the image data.

As set forth above, according to an embodiment of the present disclosure, an electronic device comprises a housing including a first surface and a second surface facing in an opposite direction of the first surface, a display exposed through the first surface of the housing and including a plurality of pixels, at least one illumination sensor disposed between the display and the second surface of the housing or disposed in the display, at least one processor electrically connected with the display and the at least one illumination sensor, and a memory electrically connected with the at least one processor, wherein the memory may store instructions configured to, upon execution by the at least one processor, cause the at least one processor to control to transmit to the display image data to be output through the plurality of pixels of the display, receive illumination-related data obtained by detecting light outside the first surface of the housing using the at least one illumination sensor, and change a brightness of at least a portion of the display based on at least a portion of the transmitted image data and the illumination-related data.

According to an embodiment of the present disclosure, the instructions may be configured to, upon execution by the at least one processor, cause the at least one processor to control to determine a mean brightness of an image represented by the image data using the transmitted image data and change the brightness of the at least a portion of the display using the determined mean brightness.

According to an embodiment of the present disclosure, the instructions may be configured to, upon execution by the at least one processor, cause the at least one processor to control to determine the number or ratio of pixels to output image data of a selected gray level among the plurality of pixels using the transmitted image data and change the brightness of the at least a portion of the display using the determined number or ratio of the pixels.

According to an embodiment of the present disclosure, the instructions may be configured to, upon execution by the at least one processor, cause the at least one processor to control to determine whether to change the brightness of the at least a portion of the display based on the illumination-related data and the transmitted image data and change the brightness of the at least a portion of the display further based on the determination.

According to an embodiment of the present disclosure, the instructions may be configured to, upon execution by the at least one processor, cause the at least one processor to control to detect a touch input or gesture input on the display and change the brightness of the at least a portion of the display further based on a position of the detected touch input or gesture input on the display.

According to an embodiment of the present disclosure, the electronic device may further comprise a black layer disposed under the display and including at least one opening, wherein at least a portion of the at least one illumination sensor is disposed in the at least one opening.

According to an embodiment of the present disclosure, the at least one illumination sensor may be integrated with at least some of the plurality of pixels.

According to an embodiment of the present disclosure, an electronic device may comprise a housing including a first surface and a second surface facing in an opposite direction of the first surface, a display exposed through the first surface of the housing and including a plurality of pixels, at least one illumination sensor disposed between the display and the second surface of the housing or disposed in the display, at least one processor electrically connected with the display and the at least one illumination sensor, and a memory electrically connected with the at least one processor, wherein the memory may store instructions configured to, upon execution by the at least one processor, cause the at least one processor to control to transmit to the display image data to be output through the plurality of pixels of the display, monitor the amount of a current consumed upon transmission of the image data, receive illumination-related data obtained by detecting light outside the first surface of the housing using the at least one illumination sensor, and change a brightness of at least a portion of the display based on at least a portion of the monitored amount of current and the illumination-related data.

According to an embodiment of the present disclosure, the instructions may be configured to, upon execution by the at least one processor, cause the at least one processor to control to determine a mean brightness of an image represented by the image data using the transmitted image data and change the brightness of the at least a portion of the display using the determined mean brightness.

According to an embodiment of the present disclosure, the instructions may be configured to, upon execution by the at least one processor, cause the at least one processor to control to detect a touch input or gesture input on the display and change the brightness of the at least a portion of the display further based on a position of the detected touch input or gesture input on the display.

According to an embodiment of the present disclosure, the electronic device may further comprise a black layer disposed under the display and including at least one opening, wherein at least a portion of the at least one illumination sensor is disposed in the at least one opening.

According to an embodiment of the present disclosure, the at least one illumination sensor may be integrated with at least some of the plurality of pixels.

According to an embodiment of the present disclosure, a method for controlling an electronic device comprising a housing including a first surface and a second surface facing in an opposite direction of the first surface, a display exposed through the first surface of the housing and including a plurality of pixels, at least one illumination sensor disposed between the display and the second surface of the housing or disposed in the display, at least one processor electrically connected with the display and the at least one illumination sensor, and a memory electrically connected with the at least one processor may comprise transmitting to the display image data to be output through the plurality of pixels of the display, receiving illumination-related data obtained by detecting light outside the first surface of the housing using the at least one illumination sensor, and changing a brightness of at least a portion of the display based on at least a portion of the transmitted image data and the illumination-related data.

According to an embodiment of the present disclosure, the method may further comprise determining a mean brightness of an image represented by the image data using the transmitted image data and changing the brightness of the at least a portion of the display using the determined mean brightness.

According to an embodiment of the present disclosure, the method may further comprise determining the number or ratio of pixels to output image data of a selected gray level among the plurality of pixels using the transmitted image data and changing the brightness of the at least a portion of the display using the determined number or ratio of the pixels.

According to an embodiment of the present disclosure, the method may further comprise determining whether to change the brightness of the at least a portion of the display based on the illumination-related data and the transmitted image data and changing the brightness of the at least a portion of the display further based on the determination.

According to an embodiment of the present disclosure, the method may further comprise determining whether to change the brightness of the at least a portion of the display based on the illumination-related data and the transmitted image data and changing the brightness of the at least a portion of the display further based on the determination.

According to an embodiment of the present disclosure, the method may further comprise detecting a touch input or gesture input on the display and changing the brightness of the at least a portion of the display further based on a position of the detected touch input or gesture input on the display.

According to an embodiment of the present disclosure, the method may further comprise, when a preset time elapses after the image data is transmitted to the display, re-receiving illumination-related data obtained by detecting light outside the first surface of the housing using the at least one illumination sensor and changing a brightness of at least a portion of the display based on at least a portion of the transmitted image data and the re-received illumination-related data.

According to an embodiment of the present disclosure, the method may further comprise, after receiving the illumination-related data, obtaining the amount of current consumed when the image data is transmitted, wherein changing the brightness of the at least a portion of the display includes changing the brightness of the at least a portion of the display based on at least a portion of the transmitted image data, the illumination-related data, and the obtained amount of current.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device, comprising:
a housing;
a display including a plurality of pixels;
an illumination sensor configured to detect light, the illumination sensor disposed below a portion of the plurality of pixels of the display;
at least one processor coupled to the display and the illumination sensor; and
a memory coupled to the at least one processor, wherein the memory stores instructions, which when executed by the at least one processor, cause the at least one processor to:
control the display to output images through the plurality of pixels of the display,
receive at least two illumination-related values obtained by the illumination sensor, and
adjust a brightness of a portion of the display based on the at least two illumination-related values and on pixel ratio (OPR) information associated with two or more frames of red, green and blue (RGB) image data output through the portion of the plurality of pixels of the display, the two or more frames corresponding to the at least two illumination-related values, and
wherein the OPR information includes information on a number of pixels to output the RGB image data or a ratio of the pixels to the plurality of pixels.

2. The electronic device of claim 1, wherein the instructions are further configured to, upon execution by the at least one processor, cause the at least one processor to:
identify the number or the ratio of the pixels to output the RGB image data among the plurality of pixels of the display by analyzing at least one frame every specific period.

3. The electronic device of claim 1,
wherein the memory stores a lookup table including information regarding a relation between illumination information and the brightness of the display, and
wherein the illumination information is identified based on the at least two illumination-related values and the RGB image data.

4. The electronic device of claim 3, wherein the instructions are further configured to, upon execution by the at least one processor, cause the at least one processor to:
identify an average illumination of the pixels to output the RGB image data among the plurality of pixels of the display, and
identify the illumination information based on at least a portion of the average illumination and the at least two illumination-related values.

5. The electronic device of claim 2, wherein the instructions are further configured to, upon execution by the at least one processor, cause the at least one processor to:
identify compensation value for the brightness of the display based on a lookup table.

6. The electronic device of claim 1, wherein the instructions are further configured to, upon execution by the at least one processor, cause the at least one processor to:
detect light outside the display during a particular period during which no image is output through the display.

7. A method for controlling an electronic device, the method comprising:
controlling a display to output images through a plurality of pixels of the display;
receiving, via an illumination sensor, at least two illumination-related values obtained by the illumination sensor; and
adjusting a brightness of a portion of the display based on the at least two illumination-related values and on pixel ratio (OPR) information associated with two or more frames of red, green and blue (RGB) image data output through a portion of the plurality of pixels of the display, the two or more frames corresponding to the at least two illumination-related values,
wherein the OPR information includes information on a number of pixels to output the RGB image data or a ratio of the pixels to the plurality of pixels.

8. The method of claim 7, further comprising:
identifying the number or the ratio of the pixels to output the RGB image data among the plurality of pixels of the display by analyzing at least one frame every specific period.

9. The method of claim 7,
wherein a memory stores a lookup table including information regarding a relation between illumination information and the brightness of the display, and
wherein the illumination information is identified based on the at least two illumination-related values and the RGB image data.

10. The method of claim 9, further comprising:
identifying an average illumination of the pixels to output the RGB image data among the plurality of pixels of the display; and
identifying the illumination information based on at least a portion of the average illumination and the at least two illumination-related values.

11. The method of claim 8, further comprising:
identifying compensation value for the brightness of the display based on a lookup table.

12. The method of claim 7, further comprising:
detecting light outside the display during a particular period during which no image is output through the display.

13. An electronic device, comprising:
a housing;
a display including a plurality of pixels;
an illumination sensor configured to detect light, the illumination sensor disposed below a portion of the plurality of pixels of the display;
at least one processor coupled to the display and the illumination sensor; and
a memory coupled to the at least one processor,
wherein the memory stores instructions, which when executed by the at least one processor, cause the at least one processor to:
control the display to output images through the plurality of pixels of the display,
receive illumination-related data obtained by the illumination sensor, and
adjust a brightness of a portion of the display based on first color information of the illumination-related data and on pixel ratio (OPR) information associated with two or more frames of red, green and blue (RGB) image data output through the portion of the plurality of pixels of the display,
wherein each of the first color information and the OPR information is associated with two or more colors, and
wherein the OPR information includes information on a number of pixels to output the RGB image data or a ratio of the pixels to the plurality of pixels.

14. The electronic device of claim 13, wherein the illumination-related data includes at least two illumination-related values corresponding to the two or more frames.

15. The electronic device of claim 1, wherein the OPR information includes the number of the pixels corresponding to a resolution of the RGB image data.

16. The method of claim 7, wherein the OPR information includes the number of the pixels corresponding to a resolution of the RGB image data.

17. The electronic device of claim 13, wherein the OPR information includes the number of the pixels corresponding to a resolution of the RGB image data.

\* \* \* \* \*